US012806578B2

(12) United States Patent
Elsharif et al.

(10) Patent No.: US 12,806,578 B2
(45) Date of Patent: Nov. 24, 2026

(54) PHTHALOCYANINE-BASED COMPOSITE MEMBRANES FOR OIL-WATER SEPARATION

(71) Applicant: Imam Abdulrahman Bin Faisal University, Dammam (SA)

(72) Inventors: Asma Mohammed Zamil Elsharif, Dammam (SA); Najah Alrasheedi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 369 days.

(21) Appl. No.: 18/758,986

(22) Filed: Jun. 28, 2024

(65) Prior Publication Data

US 2026/0001044 A1 Jan. 1, 2026

(51) Int. Cl.

| | |
|---|---|
| ***B01D 69/02*** | (2006.01) |
| ***B01D 65/08*** | (2006.01) |
| ***B01D 69/12*** | (2006.01) |
| ***B01D 71/34*** | (2006.01) |
| ***C02F 1/44*** | (2023.01) |
| ***C02F 101/32*** | (2006.01) |
| *B01D 71/82* | (2006.01) |

(52) U.S. Cl.

CPC ............. *B01D 69/02* (2013.01); *B01D 65/08* (2013.01); *B01D 69/12* (2013.01); *B01D 71/34* (2013.01); *C02F 1/44* (2013.01); *B01D 71/82* (2013.01); *B01D 2323/02* (2013.01); *B01D 2323/12* (2013.01); *B01D 2323/2187* (2022.08); *B01D 2323/36* (2013.01); *B01D 2325/025* (2013.01); *B01D 2325/04* (2013.01); *B01D 2325/36* (2013.01); *C02F 2101/32* (2013.01); *C02F 2209/03* (2013.01); *C02F 2301/066* (2013.01)

(58) Field of Classification Search

CPC ........ B01D 65/08; B01D 69/02; B01D 69/12; B01D 71/34; B01D 71/82; B01D 2323/02; B01D 2323/12; B01D 2323/2187; B01D 2323/36; B01D 2325/025; B01D 2325/04; B01D 2325/36; C02F 1/44; C02F 2101/32; C02F 2209/03; C02F 2301/066

See application file for complete search history.

(56) References Cited

U.S. PATENT DOCUMENTS

2014/0037915 A1* 2/2014 Rebouillat .......... H01M 8/0245 428/201

FOREIGN PATENT DOCUMENTS

CN 108246124 A * 7/2018 ......... B01D 67/0006
CN 108246124 B 8/2020

(Continued)

OTHER PUBLICATIONS

CN108246124A—EPO Machine Translation (Year: 2026).*

(Continued)

*Primary Examiner* — Patrick Orme
(74) *Attorney, Agent, or Firm* — Oblon, McClelland, Maier & Neustadt, L.L.P.

(57) ABSTRACT

A composite membrane based on ball type copper phthalocyanine (Cu-Pc) compounds having oil rejection rates of 98% and more when fluid mixtures of oil and water are passed through the membranes under transmembrane pressures of 1 to 3 bar. Higher performance can be attributed to the presence of ball type copper phthalocyanine compounds in the membrane matrix that enhances the hydrophilicity of the membranes.

20 Claims, 25 Drawing Sheets

(56) References Cited

FOREIGN PATENT DOCUMENTS

| | | | | |
|---|---|---|---|---|
| CN | 110075724 B | | 8/2021 | |
| CN | 115245752 A | * | 10/2022 | ............. B01D 69/02 |

OTHER PUBLICATIONS

CN115245752A—EPO Machine Translation (Year: 2026).*

Chen et al. ; Developing a PVDF catalytic membrane with high permeability, fouling resistance and self-cleaning capability for efficient oil/water emulsion separation ; Reactive and Functional Polymers, vol. 190 ; Sep. 2023 ; 6 Pages.

Shu et al. ; Fouling-resistant Composite Membranes for Separation of Oil-in-water Microemulsions* ; Chinese J. Chem. Eng., 14(1) ; Sep. 29, 2005 ; 9 Pages.

* cited by examiner (1) (2) (3) (4)

PHTHALOCYANINE-BASED COMPOSITE MEMBRANES FOR OIL-WATER SEPARATION

BACKGROUND

Technical Field

The present disclosure is directed to composite membranes containing a phthalocyanine component, more particularly to copper-phthalocyanine-based composite membranes with enhanced oil-water separation efficiency.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The utilization of membranes presents a compelling alternative or complement to conventional methods for purifying oily water, offering numerous advantages such as superior separation efficiency, scalability, reduced chemical requirements, a smaller physical footprint, and low energy consumption. Ultrafiltration (UF) membranes, featuring pore sizes ranging from 2 to 50 nm, have garnered significant attention in recent years for treating oily wastewater due to their effectiveness in removing oil, grease, and suspended solids from water streams. However, despite the UF membranes' many benefits, their susceptibility to pore clogging and surface fouling has limited their practical use in treating oily wastewater. To address this challenge and combat the growing global water scarcity, researchers are working on developing membranes with enhanced surface hydrophilicity, aiming to create membranes that offer high separation performance and are less prone to fouling. At the same time, it's important to address the limited applications of hydrophilic membranes in wastewater treatment, which is primarily due to their poor chemical and thermal stability. Researchers are actively working on developing effective membranes with low fouling characteristics to improve the treatment of oily wastewater.

Poly(vinylidene fluoride) (PVDF) has been recognized as a suitable membrane material due to its exceptional thermal and chemical stability, resistance to solvents/oxidants, and membrane-forming capabilities. However, PVDF membranes' strong hydrophobic nature and low surface energy make them highly susceptible to fouling during separation processes, leading to reduced permeability, increased operating pressure, lower product quality, and potential membrane damage. Various types of fouling, including crystalline, organic, particle and colloidal, microbiological, and others, have been identified. To mitigate PVDF membrane fouling, effective approaches involve modifying membrane properties such as pore size, porosity, and surface roughness, as well as optimizing operational conditions. Additionally, methods like surface coating, surface grafting, chemical modification, and blending with hydrophilic polymers have been employed to enhance PVDF membrane performance. Furthermore, incorporating advanced materials, chemical modifications, introducing metal-organic frameworks (MOFs), metal oxides, and grafting graphene oxide (GO) have demonstrated improvements in fouling resistance.

Phthalocyanine (Pc) metal complexes and their derivatives, a significant class of macrocyclic compounds, have found diverse applications in both scientific and technical domains. These Pc structures have been modified by introducing various substituents with varying electronic properties at different positions on the ring, including peripheral and non-peripheral locations. A noteworthy subset of these compounds is ball-type phthalocyanines, where two phthalocyanine monomers are connected through benzene derivatives originating from the periphery of the benzene rings. Initially synthesized in 2002, metal-free and coordinated ball Pcs with two homo or hetero-metal centers have been utilized in catalysis, chemical sensors, electrochromism, photodynamic treatment, and liquid crystals. Phthalocyanines are being considered for their uses in various areas owing to their exceptional properties, however, their utility in the fabrication of membranes, in particular, membranes that can be used for removing oil from oil-water emulsions has not been explored yet.

Accordingly, it is one object of the present disclosure to provide phthalocyanine-based membranes that possess higher oil removal ability and anti-fouling characteristics, thereby making them more useful in the treatment of oil spills or oil-containing wastewater.

SUMMARY

In an exemplary embodiment, a composite membrane for oil-water separation is described. The membrane comprises a fluoropolymer, a stabilizer and a ball-type copper phthalocyanine (Cu-Pc) compound having a Formula (I);

Formula [I]

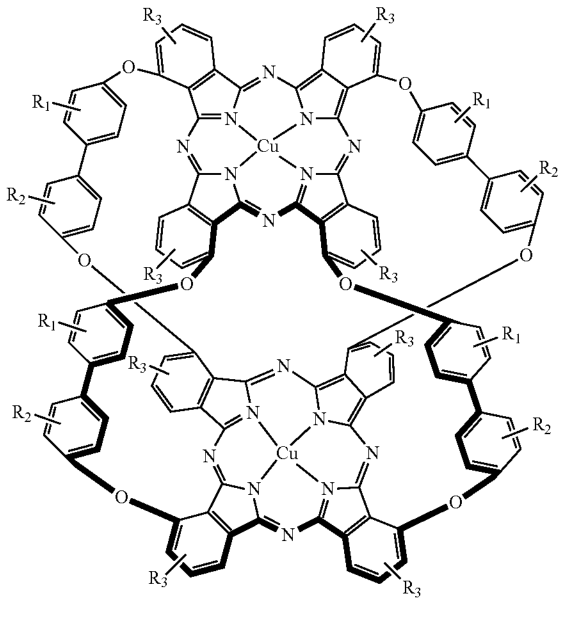

wherein $R_1$, $R_2$, and $R_3$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

In some embodiments, the fluoropolymer is selected from the group consisting of poly(vinylidene fluoride), copolymer of vinylidene fluoride and hexafluoropropylene, copolymer of tetrafluoroethylene and vinylidene fluoride, terpolymer of tetrafluoroethylene, vinylidene fluoride and hexafluoropropylene, and combinations thereof.

In some embodiments, the fluoropolymer is poly(vinylidene fluoride) (PVDF).

In some embodiments, the stabilizer is polyvinylpyrrolidone (PVP).

In some embodiments, the Cu-Pc compound has a Formula (II)

Formula [II]

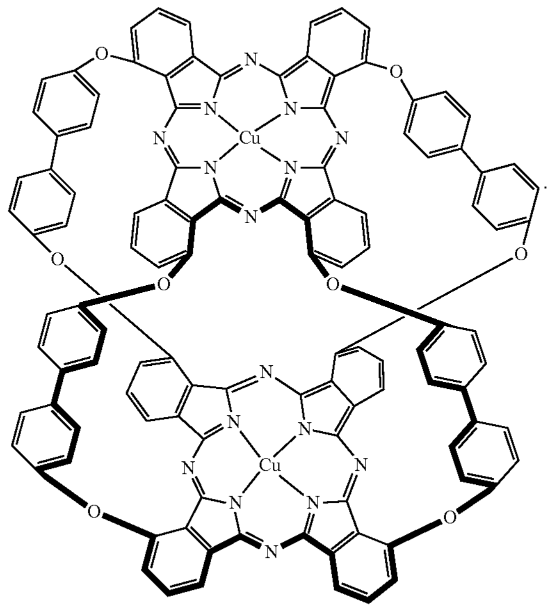

In some embodiments, the composite membrane comprises 89 to 99 wt. % of the fluoropolymer; 1 to 8 wt. % of the stabilizer; and 0.01 to 3 wt. % of the Cu-Pc compound, each wt. % based on a total weight of the composite membrane.

In some embodiments, the fluoropolymer is PVDF, and the stabilizer is PVP, and the composite membrane comprises 93 to 98 wt. % of PVDF; 3 to 5 wt. % of PVP; and 0.4 to 1.2 wt. % of the Cu-Pc compound, each wt. % based on the total weight of the composite membrane.

In some embodiments, the composite membrane has a layered structure comprising a surface layer and a bottom layer.

In some embodiments, the surface layer is in the form of a porous sheet having an average thickness of 50 to 800 nanometers (nm).

In some embodiments, the bottom layer is in the form of a finger-like porous structure layer having an average thickness of 30 to 100 micrometers (μm).

In some embodiments, the Cu-Pc compound is present in an amount of about 0.2 to 1.2 wt. % based on a total weight of the composite membrane, and wherein the composite membrane has a water flux of from 100 to 115 liters per square meter per hour ($L/m^2$ h) under a pressure of about 1 bar.

In some embodiments, the Cu-Pc compound is present in an amount of about 0.2 to 1.2 wt. % based on a total weight of the composite membrane, and wherein the composite membrane has a water flux of from 260 to 360 $L/m^2$ h under a pressure of about 2 bar.

In some embodiments, the Cu-Pc compound is present in an amount of about 0.2 to 1.2 wt. % based on a total weight of the composite membrane, and wherein the composite membrane has a water flux of from 420 to 780 $L/m^2$ h under a pressure of about 3 bar.

In some embodiments, a method for oil/water separation is disclosed. The method comprises passing a fluid mixture comprising oil and water through the composite membrane to form an oil layer on a surface of the composite membrane, and a residue stream wherein the passing is performed under a pressure of from 1 to 3 bar. The oil comprises at least one water-insoluble hydrocarbon containing 5 to 22 carbon atoms and the residue stream is substantially free of oil.

In some embodiments, the method of oil-water separation has an oil rejection rate of at least 98% based on an amount of oil present in the fluid mixture under a pressure of 1 to 3 bar.

In some embodiments, a method of preparing the Cu-Pc compound is described. The method includes preparing the Cu-Pc compound by mixing and heating a nitrophthalonitrile of Formula (III), a biphenol of Formula (IV) and DMSO in the presence of a base to form a precursor; and heating the precursor and copper (II) acetate to form a mixture, and washing; wherein Formula (III) is Formula (III)

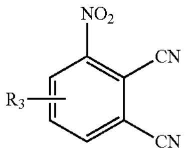

wherein Formula (IV) is:

Formula (IV)

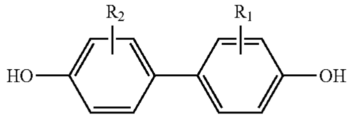

wherein $R_1$, $R_2$, and $R_3$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

In some embodiments, the nitrophthalonitrile is 3-nitrophthalonitrile, and the biphenol is 4,4'-dihydroxybiphenyl.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
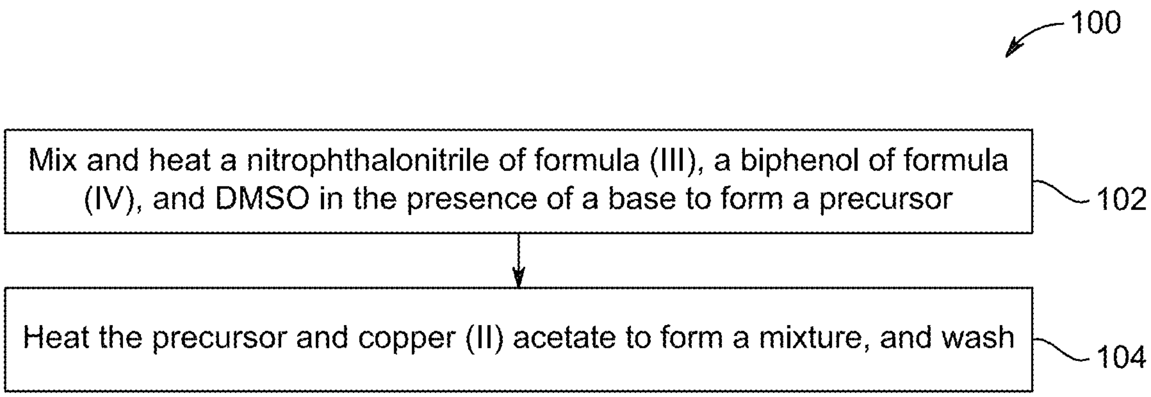
FIG. 1A is a flowchart depicting a method of preparing a copper phthalocyanine compound (compound 4) according to certain embodiments.

In the drawings, reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "compound" refers to a chemical entity, whether as a solid, liquid, or gas, and whether in a crude mixture or isolated and purified.

As used herein, the term "phthalocyanine" refers to an organic compound comprising four isoindole units that are linked by nitrogen atoms forming a ring like structure.

As used herein, the term "membrane" refers to a porous structure that is usually made of a polymer, ceramic material or metals in some cases. Membranes are used to filter solids, particulate matter or colloids from a solution.

As used herein, the term "composite membrane" refers to a membrane comprising different materials, usually two or more, that function together to improve the properties of the membrane.

As used herein, the term "polymer" refers to a larger molecule made of multiple smaller units of smaller molecules, repeating themselves in a specific arrangement.

As used herein, "pore size" may be considered the lengths or longest dimensions of a pore opening.

As used herein, the term "permeate" refers to the filtrate that passes through a membrane.

As used herein, the term "flux" refers to the amount of a liquid that flows through a membrane area in a specified time period.

As used herein, the term "flux recovery ratio" abbreviated as FRR, is used to determine the fouling resistance of a membrane.

As used herein, the term "fouling" refers to the blockage of the membrane pores that occurs when the solute, colloid or particulate matter, to be filtered from a solution, gets adsorbed on the surface of the membrane.

As used herein, the term "transmembrane pressure" refers to the pressure that needs to be applied to push a liquid through a membrane.

The present disclosure is intended to include all hydration states of a given compound or Formula, unless otherwise noted or when heating a material.

Aspects of the present disclosure are directed to membranes based on copper phthalocyanine (Cu-Pc) for the separation and removal of oil from an oil-water mixture. The compound copper ball-type phthalocyanine was synthesized and was evaluated for its potential as a membrane for oil-water separation. The Cu-Pc membrane of the present disclosure demonstrates a flux recovery ratio of for example 98.5%, which signifies excellent fouling resistance of the Cu-Pc membranes.

Disclosed herein is a composite membrane for oil-water separation wherein the membrane comprises a ball-type copper phthalocyanine compound (Cu-Pc), a fluoropolymer, and a stabilizer. Ball-type copper phthalocyanine compounds comprise two phthalocyanine monomers linked through benzene derivatives originating from the peripheral positions of the benzene rings, wherein each phthalocyanine monomer has a copper atom at its center. In some embodiments, the ball-type copper phthalocyanine compound has a Formula (I);

Formula [I]

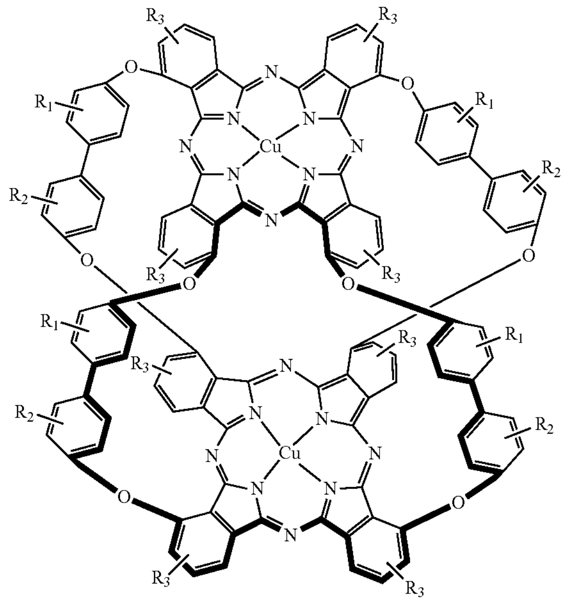

wherein $R_1$, $R_2$, and $R_3$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

In some embodiments, the $R_1$, $R_2$, and $R_3$ groups in the Cu-Pc compound with Formula [I] are each substituted with hydrogen to obtain a Cu-Pc compound having a Formula (II):

Formula [II]

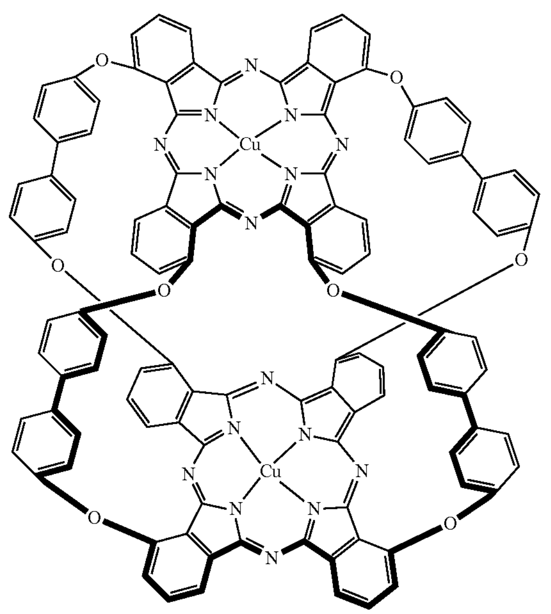

In some embodiments, the composite membrane includes 0.01 to 3 wt. % of the Cu-Pc compound, preferably 0.02 to 2 wt. % of the Cu-Pc compound, preferably 0.03 to 1 wt. % of the Cu-Pc compound, preferably 0.04 to 0.9 wt. % of the Cu-Pc compound, preferably 0.05 to 0.8 wt. % of the Cu-Pc compound, preferably 0.06 to 0.7 wt. % of the Cu-Pc compound, preferably 0.07 to 0.6 wt. % of the Cu-Pc compound, preferably 0.08 to 0.5 wt. % of the Cu-Pc compound, preferably 0.09 to 0.4 wt. % of the Cu-Pc compound, preferably 0.1 to 0.3 wt. % of the Cu-Pc compound based on the total weight of the composite membrane. In certain embodiments, the composite membrane includes 0.6 wt. % of the Cu-Pc compound based on the total weight of the composite membrane. In some embodiments, the composite membrane comprises 0.4 wt. % of the Cu-Pc compound based on the total weight of the composite membrane. In specific embodiments, the composite membrane comprises 0.2 wt. % of the Cu-Pc compound based on the total weight of the composite membrane.

In some embodiments, the composite membrane comprises a fluoropolymer. Fluoropolymers are fluorocarbon-based polymers having repetitive units of monomer units containing carbon and fluorine atoms and are known to possess excellent stability and mechanical strength. In some embodiments, the fluoropolymer may be selected from the group consisting of poly(vinylidene fluoride), copolymers of vinylidene fluoride and hexafluoropropylene, copolymers of tetrafluoroethylene and vinylidene fluoride, terpolymers of tetrafluoroethylene, vinylidene fluoride and hexafluoropropylene, and combinations thereof. In a preferred embodiment, the fluoropolymer is poly(vinylidene fluoride) (PVDF).

In some embodiments, the composite membrane comprises 89 to 99 wt. % of the fluoropolymer, preferably 90 to 98 wt. % of the fluoropolymer, preferably 91 to 97 wt. % of the fluoropolymer, preferably 92 to 96 wt. % of the fluoropolymer, preferably 93 to 95 wt. % of the fluoropolymer based on the total weight of the composite membrane.

In another embodiment, the composite membrane comprises a stabilizer for stabilizing the membrane. In certain embodiments, the stabilizer is polyvinylpyrrolidone (PVP). Polyvinylpyrrolidone is highly soluble in water and improves the hydrophilic properties of a membrane. In some embodiments, the composite membrane comprises 1 to 8 wt. % of the stabilizer, preferably 2 to 7 wt. % of the stabilizer, preferably 3 to 6 wt. % of the stabilizer, preferably 4 to 5 wt. % of the stabilizer based on the total weight of the composite membrane. In some embodiments, the composite membrane comprises 4 wt. % of the stabilizer based on the total weight of the composite membrane. In a preferred embodiment, the composite membrane comprises 2 wt. % of the stabilizer based on the total weight of the composite membrane.

The composite membranes, according to certain embodiments, may comprise 89 to 99 wt. % of the fluoropolymer, 1 to 8 wt. % of the stabilizer, and 0.01 to 3 wt. % of the Cu-Pc compound each wt. % based on the total weight of the composite membrane. In some embodiments, wherein the fluoropolymer is PVDF, and the stabilizer is PVP, the composite membrane may comprise 93 to 98 wt. % of PVDF, 3 to 5 wt. % of PVP and 0.4 to 1.2 wt. % of the Cu-Pc compound, each wt. % based on the total weight of the composite membrane.

The composite membrane may be present in a layered structure having a surface layer and a bottom layer. The surface layer may be thin and compact and may be present in the form of a porous sheet. In some embodiments, the surface layer may have an average thickness of 50 to 800 nanometers (nm). In certain embodiments, the surface layer may have an average thickness of 60 to 700 nm, preferably 70 to 600 nm, preferably 80 to 500 nm, preferably 90 to 400 nm, preferably 100 to 300 nm. The surface layer actively filters the oil water mixture and retains the oil on its surface and/or on a surface side of the membrane allowing only water to pass through the membrane.

The bottom layer provides structural support to the membrane. In some embodiments, the bottom layer has a porous finger like structure having an average thickness of 30 to 100 micrometers (μm). In specific embodiments, the bottom layer may have an average thickness of 40 to 90 μm, preferably an average thickness of 50 to 80 μm, preferably an average thickness of 60 to 70 μm.

The finger-like structures represent extensions of an open or closed cellular structure. The top layer may be viewed as a skin covering a porous layer having a cellular structure with extended or elongated cells. The cell walls of the extended or elongated cells resembling fingers. The cells of the bottom later are preferably elongated perpendicular to the skin or top layer. Fingers may extend continuously from the top layer to the outer surface of bottom layer or to a substrate supporting the bottom layer.

In some embodiments, a method for oil-water separation is described. The method includes passing a fluid mixture comprising an oil and water through the composite membrane. As the fluid passes through the membrane, the oil in the fluid is retained on the surface of the membrane while the water passes through the membrane as the residue stream. In some embodiments, the residue stream is substantially free of oil. In certain embodiments, the oil in the fluid is a water-insoluble hydrocarbon. In specific embodiments, the oil in the fluid is a water-insoluble hydrocarbon comprising 5 to 22 carbon atoms, preferably 7 to 20 carbon atoms, preferably 9 to 18 carbon atoms, preferably 11 to 16 carbon atoms, preferably 14 carbon atoms, preferably 13 carbon atoms. The fluid mixture comprising the oil and water is passed through the membrane under a transmembrane pressure of 1 to 3 bar, preferably 1, 2, or 3 bar.

The water flux, when the fluid mixture is passed through the membrane, may vary from 100 $L/m^2$ h to 800 $L/m^2$ h. The water flux through the membrane is related to the amount of Cu-Pc compound in the membrane and the transmembrane pressure applied when the fluid is passed through it. In an exemplary embodiment, the composite membrane has a water flux ranging from 100 to 115 liters per square meter per hour ($L/m^2$ h) when the Cu-Pc compound is present in an amount of about 0.2 to 1.2 wt. % based on the total weight of the composite membrane and the transmembrane pressure applied to the membrane is about 1 bar. In another exemplary embodiment, the composite membrane has a water flux ranging from 260 to 360 $L/m^2$ h, when the Cu-Pc compound is present in an amount of about 0.2 to 1.2 wt. % based on the total weight of the composite membrane and the transmembrane pressure applied to the membrane is of about 2 bar. In one more exemplary embodiment, the composite membrane has a water flux ranging from 420 to 780 $L/m^2$ h when the Cu-Pc compound is present in an amount of about 0.2 to 1.2 wt. % based on the total weight of the composite membrane and the transmembrane pressure applied to the membrane is about 3 bar.

The composite membrane, according to the present invention, shows excellent oil rejection ability, which corresponds to the oil-repelling properties of the Cu-Pc compound present in the membrane. In certain embodiments, when a transmembrane pressure of 1 to 3 bar is applied to the membrane, the membrane exhibits an oil rejection rate of at least 98%, preferably at least 99% or at least 99.5%, depending on the amount of oil present in the fluid mixture. For example, the composite membrane exhibits an oil rejection rate of about 98.2% when the membrane comprises 0.6 wt % of Cu-Pc compound and a transmembrane pressure of 1 bar is applied. The anti-fouling properties of the membrane are further exhibited by a very low irreversible flux which is about 1.5% or less, preferably 1.3% or less, 1.0% or less, 0.5% or less or 0.1% or less.

Referring to FIG. 1A, a schematic flow diagram of the method 100 synthesis of Cu-Pc compound is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes preparing a mixture of a nitrophthalonitrile, a biphenol and dimethylsulfoxide (DMSO) followed by the addition of a base to form a precursor. In certain embodiments, the nitrophthalonitrile is of the Formula (III):

Formula (III)

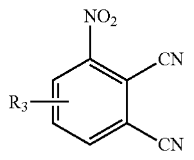

Wherein $R_3$ may be independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

In a preferred embodiment, the nitrophthalonitrile is 3-nitrophthalonitrile.

In some embodiments, the biphenol compound is of the Formula (IV):

Formula (IV)

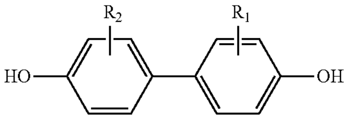

wherein $R_1$ and $R_2$ may be each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

In a specific embodiment, the biphenol compound is 4,4'-dihydroxybiphenyl.

The base may be a water-soluble salt, for example, potassium carbonate. After the addition of base to the mixture, the mixture is kept for a period of 70-75 hours for proper dissolution of the compounds and then heated at temperatures of about 30 °C to 50 °C for 1 to 3 hours. In some embodiments, the mixture is heated at a temperature of 40 °C for a period of 2 hours. Heating the mixture results in the formation of a precursor.

At step 104, the method 100 includes heating the precursor and copper (II) acetate in the presence of a poler organic solvent such as dimethylformamide (DMF) at temperatures of about 150 °C to 200 °C for a period of 10-14 hours to form compound 4. In certain embodiments, the precursor and copper (II) acetate are heated in the presence of DMF at temperatures of about 170° C. to 180 °C for a period of 12-13 hours to form compound 4. In specific embodiments, the precursor and copper (II) acetate are heated in the presence of DMF at a temperature of about 180° C. for a period of 12 hours to form compound 4.

The resulting compound 4 is washed with water and an organic solvent, wherein the organic solvent may be an alcohol, preferably methanol. The washing may be done once or may be repeated 2-3 times to remove any unreacted compound. The compound 4 is then filtered and dried to yield the Cu-Pc compound according to the present invention.

The membranes of the present invention are scalable, cost-effective, and highly efficient, which makes them the most preferred alternative to the existing membranes for use in wastewater treatment plants and various industries, including food and beverage industries, power generation plants, mining industries, chemical manufacturing plants, and the like.

EXAMPLES

The following examples demonstrate the synthesis of copper phthalocyanines as described herein. The examples are provided solely for illustration and are not to be construed as limitations of the present disclosure, as many variations thereof are possible without departing from the spirit and scope of the present disclosure.

Example 1: Synthesis and Confirmation of the Structure of Compound 3

Figure 1B:
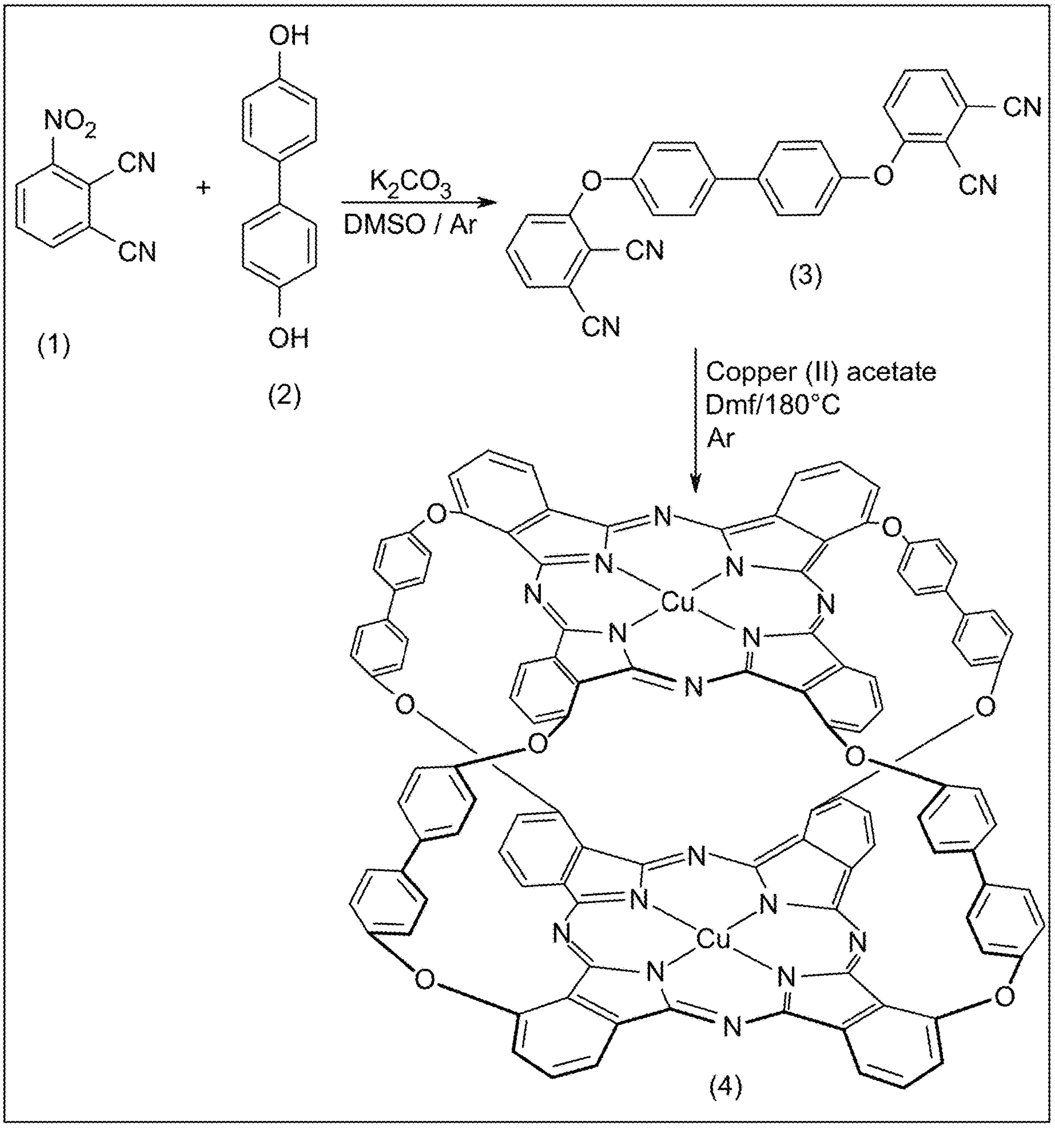
FIG. 1B is a schematic illustration depicting a process of preparing compound 4, according to certain embodiments.
Figure 1C:
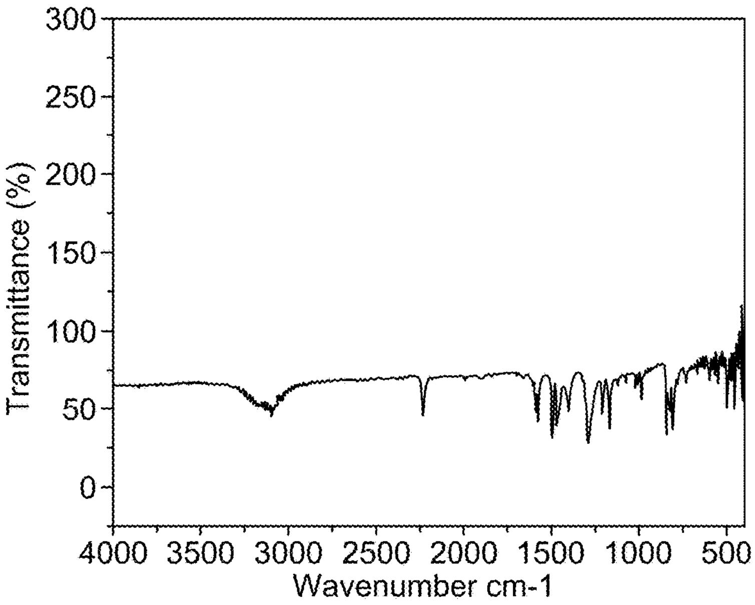
FIG. 1C shows a Fourier Transform Infrared (FTIR) (KBr) spectrum of compound 3, according to certain embodiments.
Figure 1C:
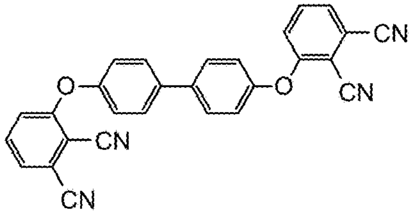
Figure 1D:
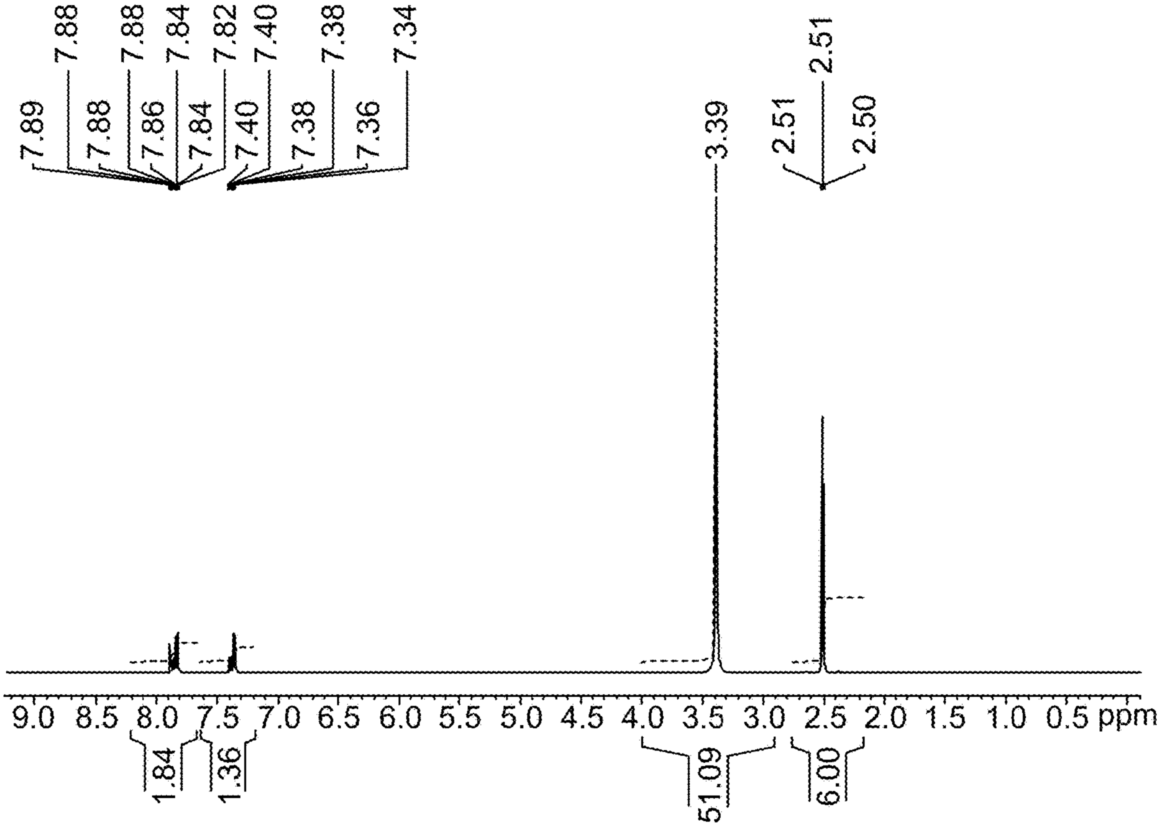
FIG. 1D shows $^1$H nuclear magnetic resonance (NMR) (500 MHz DMSO-$d_6$) spectrum of compound 3, according to certain embodiments.
Figure 1E:
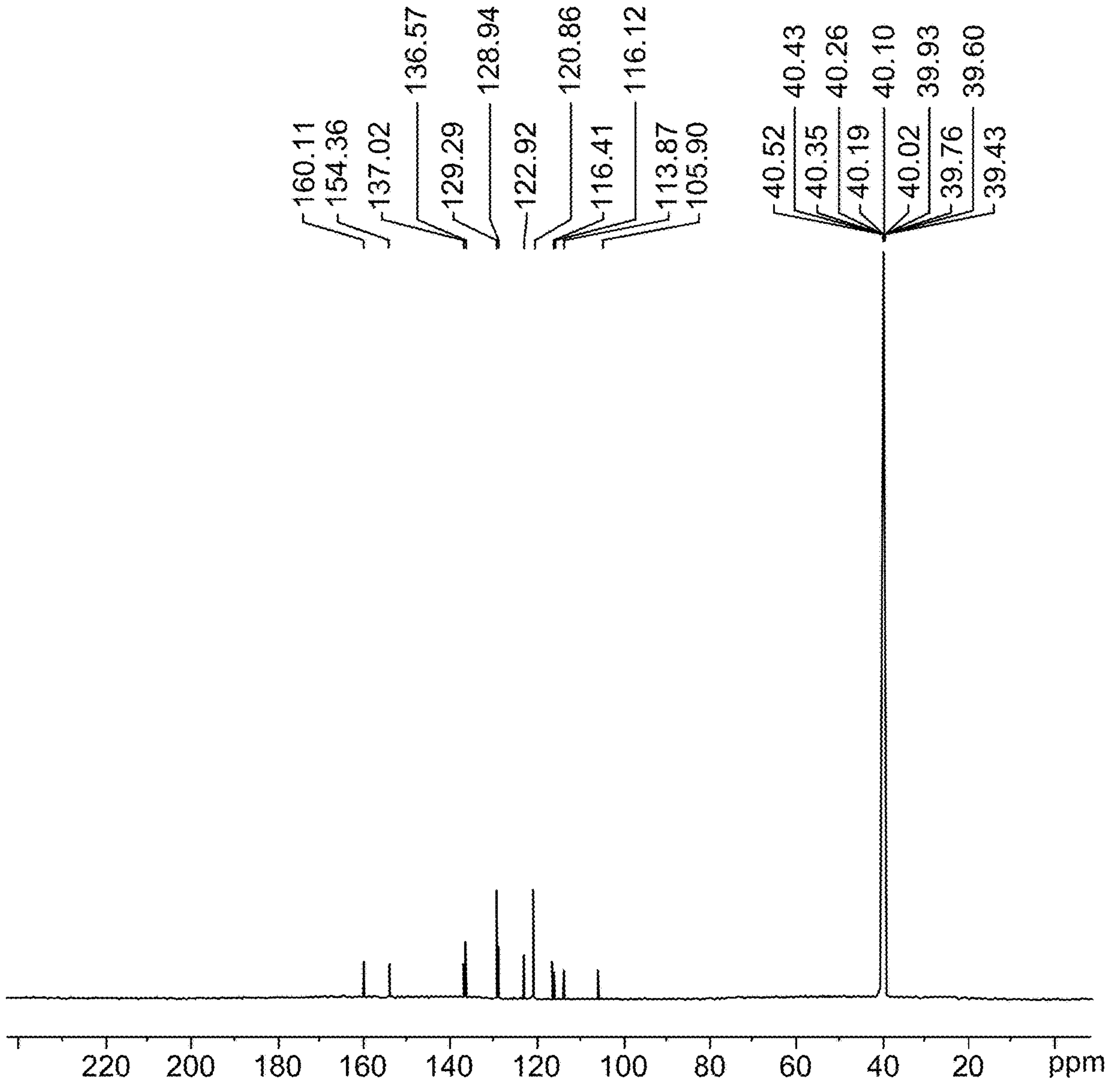
FIG. 1E shows $^{13}$C NMR spectrum of compound (3) spectrum, according to certain embodiments.

Phthalonitriles (1) are a common starting material because they provide excellent yields of the desired phthalocyanine dimers. 3-nitrophthalonitrile, a diphthalonitrile, was utilized to create a symmetrical ball Pc using synthesis and workup procedures, as illustrated in FIG. 1B. 3-nitrophthalonitrile and 4,4'-Dihydroxybiphenyl are in stirred in dry dimethyl sulfoxide at room temperature (RT) under Ar. Then potassium carbonate was introduced to the reaction as a base. After 72 h, the reaction was heated for about 2 hours at 40 °C. After the workup, the resulting new compound was confirmed by Fourier-Transform Infrared (FT-IR) with KBr pellets and presented in FIG. 1C. One piece of evidence for the successful synthesis of compound (3) is the band's appearance (C—O—C) at 1290/1180 $cm^{-1}$. Also, the disappearance of the (OH) peak. Ar (C═C) peak at 1590/1500 $cm^{-1}$. $^{1}H$ nuclear magnetic resonance (NMR) spectrum (FIG. 1D) was recorded in DMSO-d6, confirming the desired compound's aromatic proton (Ar—H). $^{13}C$ NMR shows twelve environments; the unique peaks are sp CN around 115 ppm, $sp^2$ C═C around 130 ppm, $sp^3$ C—C around 114 ppm, and C—Ar around 160 ppm (FIG. 1E).

Example 2: Synthesis and Characterization of the Structure of the Symmetrical Ball Copper Phthalocyanine (Compound 4)

Figure 2A:
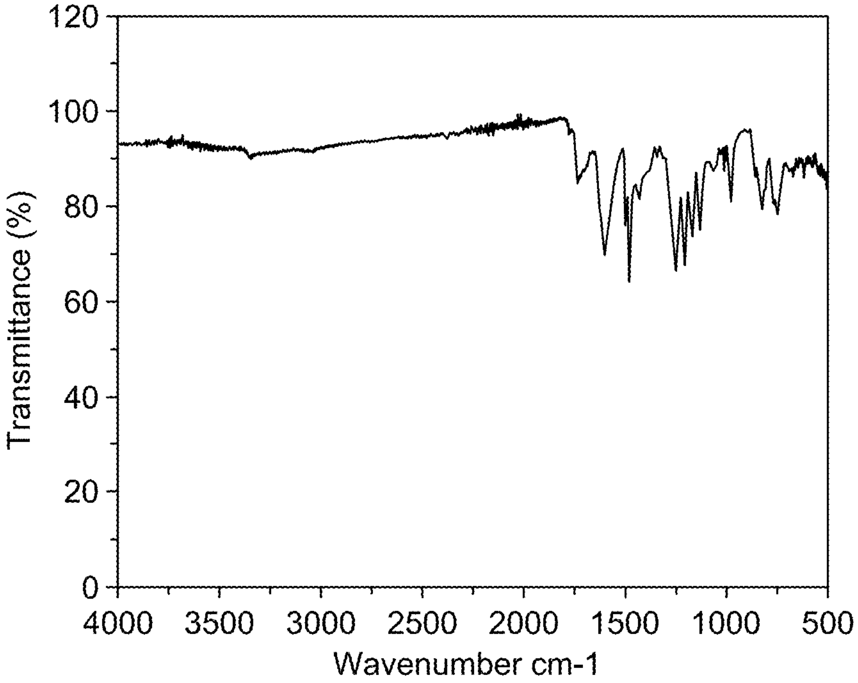
FIG. 2A shows FTIR spectrum of compound 4, according to certain embodiments.
Figure 2B:
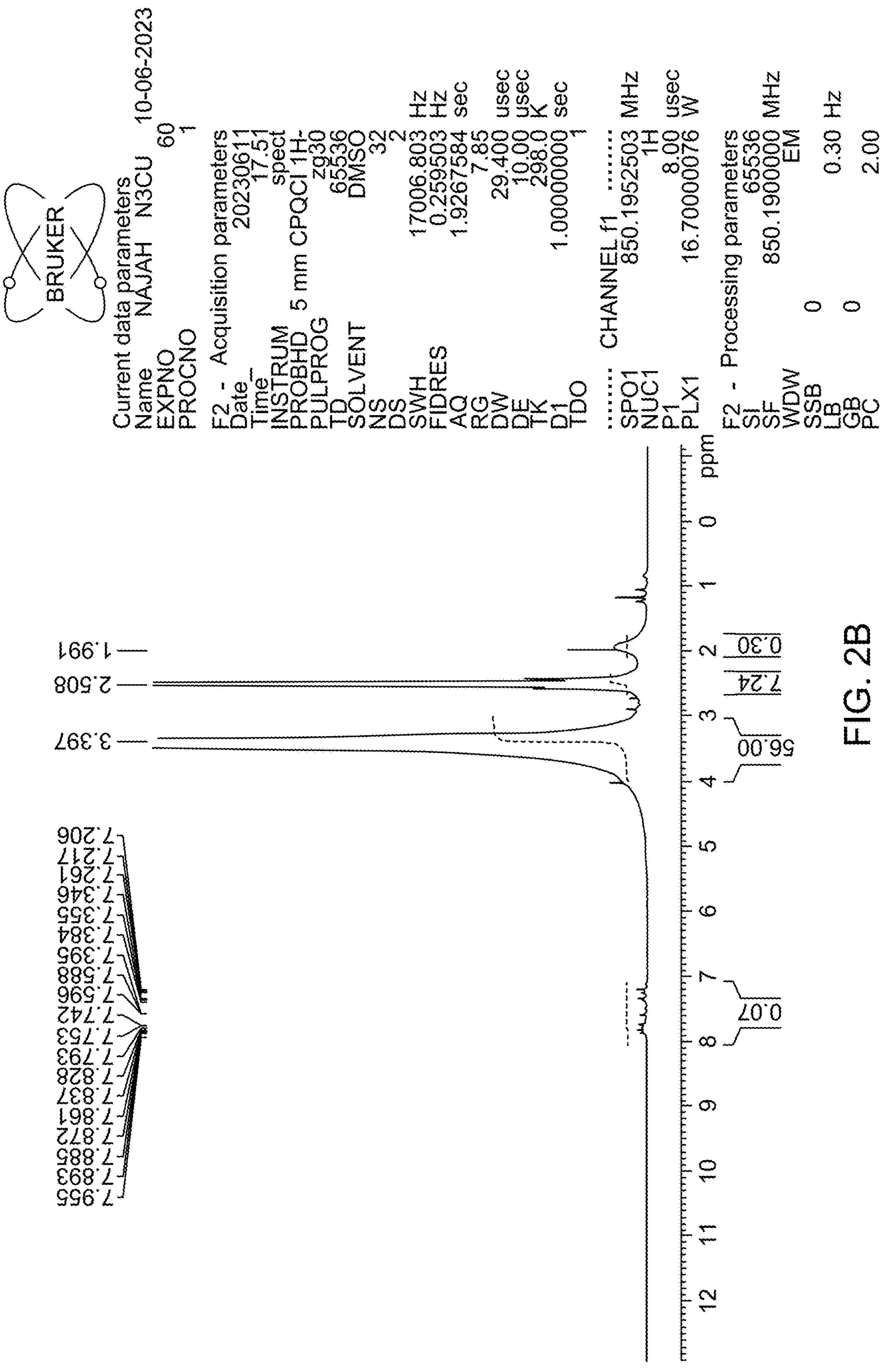
FIG. 2B shows $^1$H NMR at (500 MHz DMSO-$d_6$) spectrum of compound 4, according to certain embodiments.

Compound (3) and copper (II) acetate were mixed in 3 ml of DMF, then in a sealed glass tube heated for 12 h using Argon around 180 °C. The CuPc structure was confirmed using (FTIR), Uv-Vis, and ($^{1}$HNMR). The main indicator of the formation of copper ball-type phthalocyanine was the absence of the sharp intense (C≡N) stretching band at 2235 $cm^{-1}$ in FTIR spectra (FIG. 2A). The spectra were difficult to interpret, and this was expected to happen due to the dimer structure; however, aromatic protons in the aromatic area were verified in this area. The aromatic protons were detected at nearly 7.2-8 ppm in the $^{1}H$ NMR spectra of CuPc (FIG. 2B), which is attributable to the 4,4'-dihydroxybiphenyl bridge in the symmetrical-ball complex. Furthermore, the resulting peaks were quite broad, as is typical of face-to-face complexes [See: Leznoff C. C., Marcuccio, S. M, Greenberg, S., Lever; A. B. P., & Tomer, K. B. (1985). *Metallophthalocyanine dimers incorporating five-atom covalent bridges. Canadian journal of chemistry,* 63(3), 623-631, incorporated herein by reference in its entirety].

Figure 3:
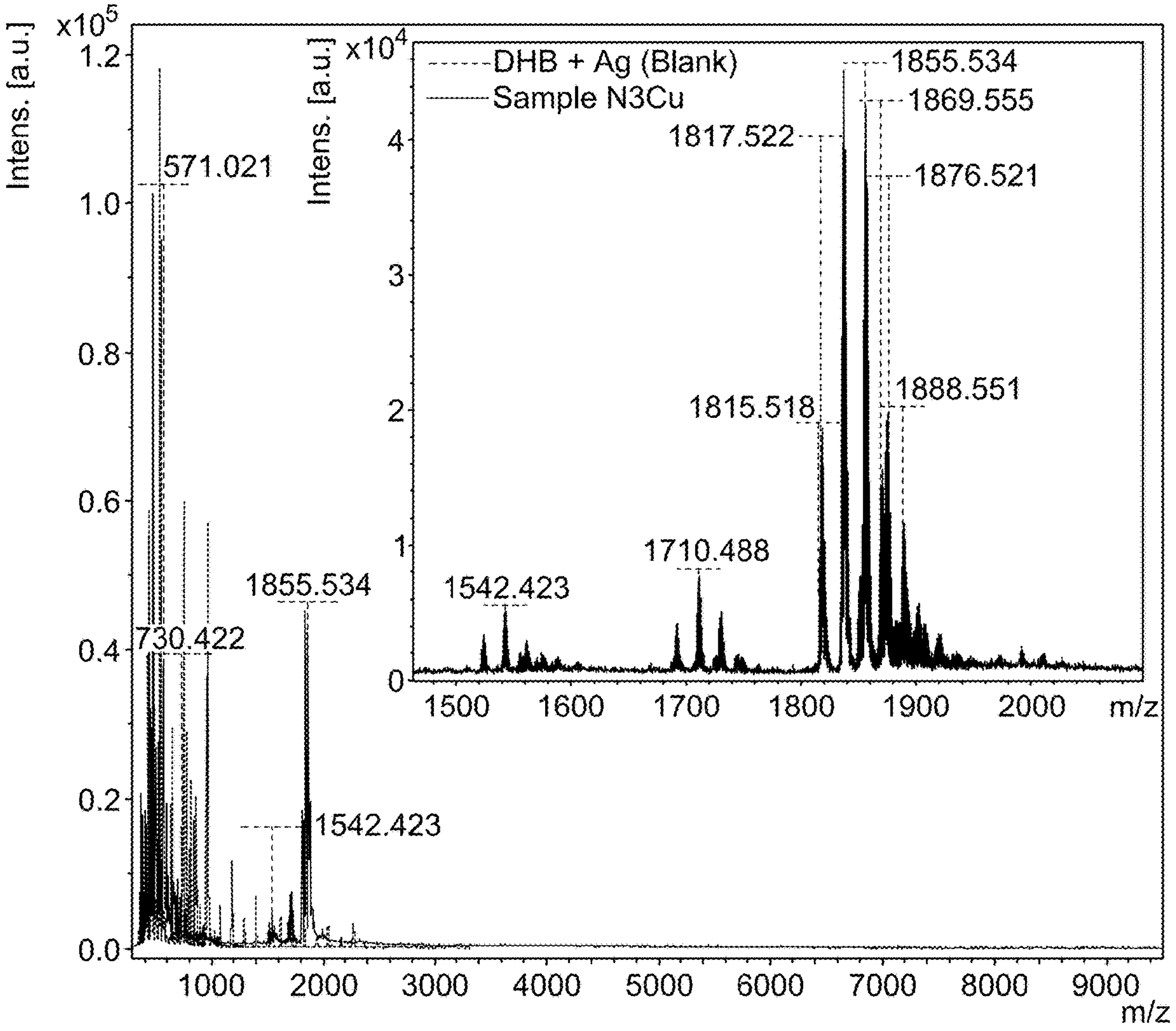
FIG. 3 shows matrix-assisted laser desorption/ionization-time of flight (MALDI-TOF) mass spectrum (MS) of compound 4 in positive ions and linear mode, according to certain embodiments.

Furthermore, the matrix-assisted laser desorption/ionization-time of flight (MALDI-TOF) mass spectrum (MS) of compound 4 (FIG. 3) in positive ions and linear mode was obtained and the analysis was carried out using a Bruker Autoflex MALDI-TOF MS in Reflectron mode. Samples were checked at different mass ranges, but the final data was acquired between 300 and 9500 Da. Laser power was optimized according to observed ion intensities to ensure sufficient ion generation with minimal analyte degradation. MALDI-TOF-MS with exceptional resolution was recorded. The peak intensities and distribution of isotopic mass of the experimental results were compared with the theoretically calculated intensities and distribution of isotopic mass of this compound. Also, a theoretical calculation was found m/z: 1879, and a peak was detected experimentally around 1855. It was noted that the findings of the experiments and the theories were in good agreement because the same peak is not found in the blank (matrix+Ag salt). The inset is an expanded view of the peak at m/z 1855.

Figure 4A:
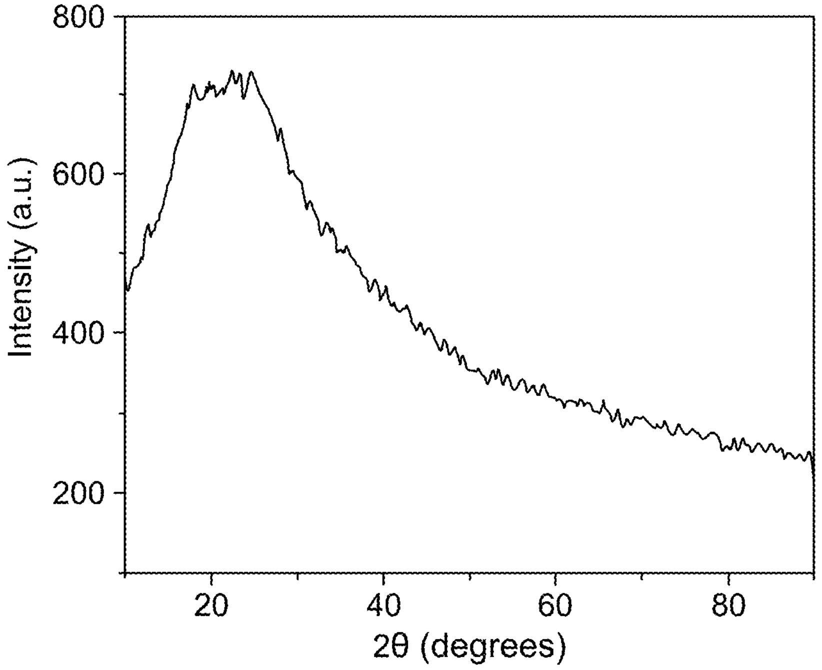
FIG. 4A shows X-ray diffraction (XRD) patterns for compound 4, according to certain embodiments.
Figure 4B:
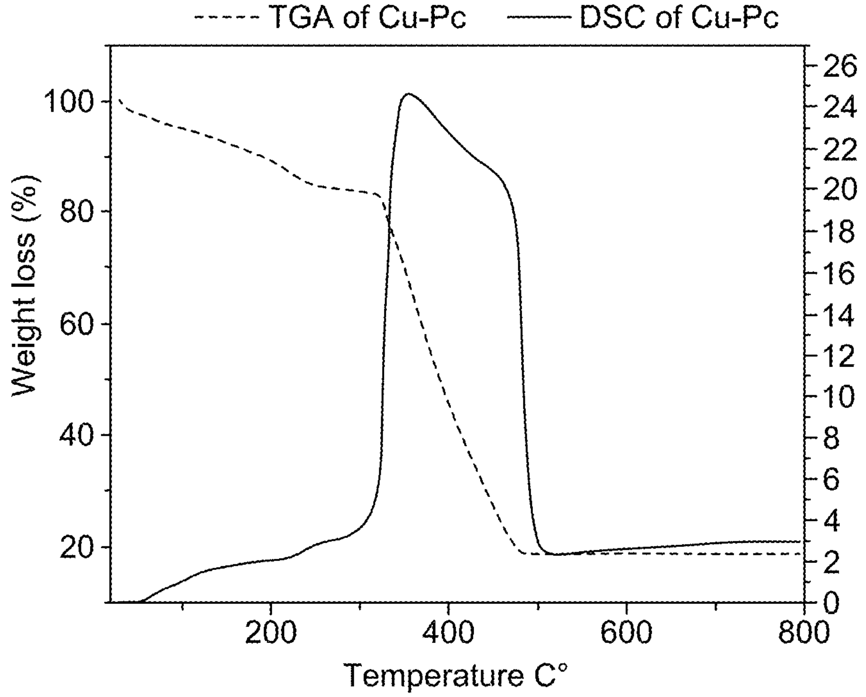
FIG. 4B shows thermogravimetric analysis (TGA) analysis for compound 4, according to certain embodiments.
Figure 4C:
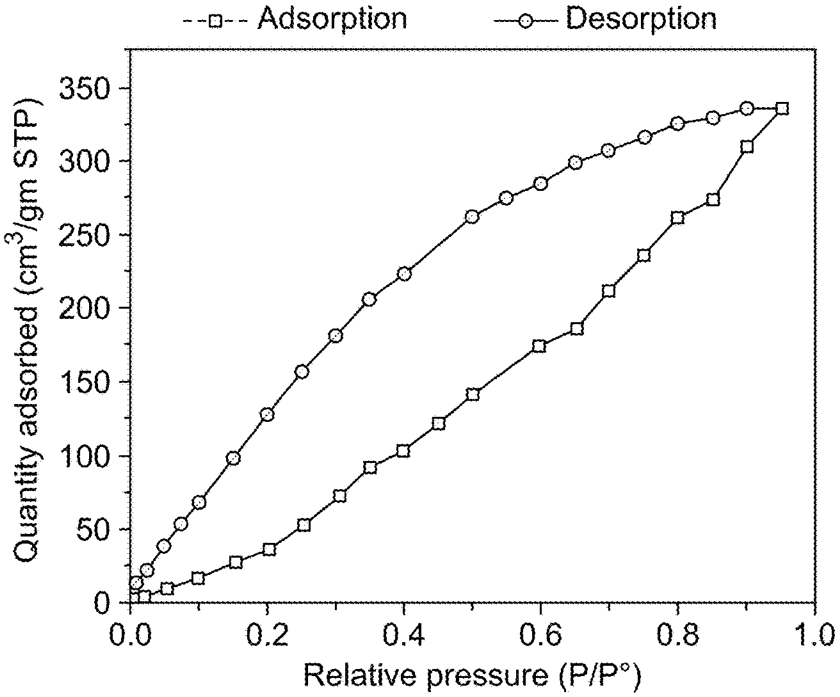
FIG. 4C shows Brunauer-Emmett-Teller (BET) $N_2$ adsorption isotherms for compound 4, according to certain embodiments.
Figure 4D:
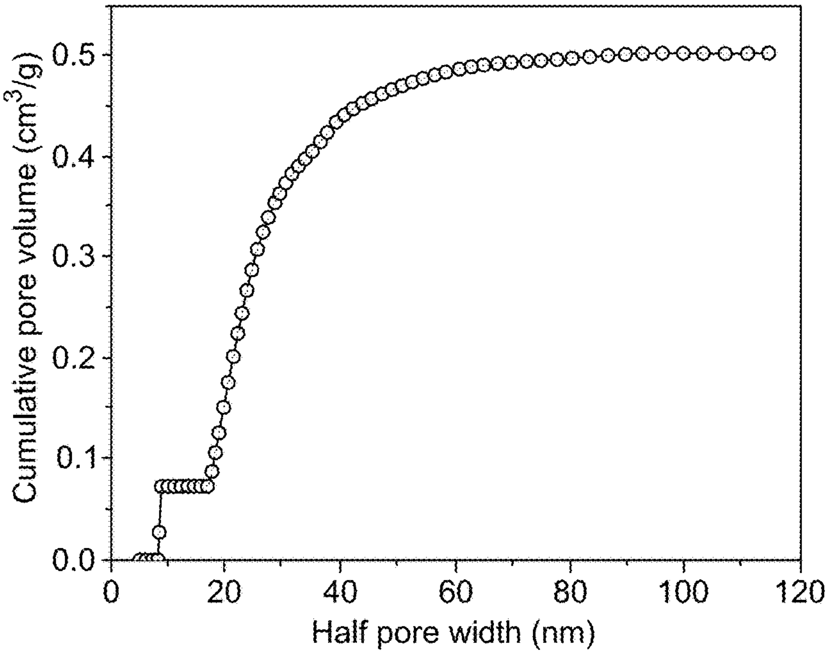
FIG. 4D shows pore size distribution compound 4, according to certain embodiments.

FIG. 4A shows X-ray diffraction (XRD) patterns obtained on the Rigaku Miniflex-II x-ray diffractometer using CuK radiation in the 2θ 5°-80° range. The X-ray diffraction analysis was carried out to characterize the preferred orientation of CuPc crystallites. A broad peak at 2θ=17 to 28.5° obtained at higher heat-treatment temperature due to the crystalline Cu-pc, therefore high treatment temperatures foster agglomeration and the development of crystalline phases. By using the Scherrer equation to calculate crystallite size (D) was found to be 0.839714 nm. Usually, the phthalocyanine peaks appear, and shift ranges at higher 2θ depending on the metal ion. The broad peak is typical of copper phthalocyanine has been reported in previous publications [See: Cheng, Z., Cui, N., Jiang, S., Zhang, H., Zhu, L., & Xia, D. (2015). *Microwave-promoted synthesis of sulfonated metallophthalocyanines and aggregation in different solvents. Advances in Materials Science and Engineering,* 2015; Ardestani, N. S., Sodeifian, G., & Sajadian, S. A. (2020). *Preparation of phthalocyanine green nano pigment using supercritical CO2 gas antisolvent* (*GAS*): *experimental and modeling. Heliyon,* 6(9); Denekamp, I. M., Veenstra, F. L., Jungbacker, P., & Rothenberg, G. (2019). *A simple synthesis of symmetric phthalocyanines and their respective perfluoro and transition-metal complexes. Applied Organometallic Chemistry,* 33(5), e4872, each incorporated herein by reference in its entirety]. Moreover, the obtained result matches the previous reports; a broad peak appears, and that might be due to non-uniform strain, agglomeration, and face-to-face interaction of ball-cu structure phthalocyanine. The summary of XRD data for the copper phthalocyanine is given in Table 1. Thermogravimetric analysis (TGA) was used to determine the thermal stability of Cu-Pc when it was heated from room temperature to 900 degrees Celsius. FIG. 4B exhibits three typically stable stages during heat treatment. The first stage is from room temperature to 215 degrees Celsius, during which time Cu-Pc maintains a stable molecular structure, and only a small amount of weight is lost 10-12% due to residual water evaporation. The TGA of previous reports [See: Vallejos-Burgos, F., Utsumi, S., Hattori, Y., Garcia, X., Gordon, A. L., Kanoh, H., . . . & Radovic, L. R. (2012). *Pyrolyzed phthalocyanines as surrogate carbon catalysts: Initial insights into oxygen-transfer mechanisms. Fuel,* 99, 106-117., incorporated herein by reference in its entirety.] found out that with increasing heat treatment temperature, carbon and metal levels increased, but nitrogen and hydrogen contents declined, with a considerable loss of nitrogen occurring between 325 and 480 °C. Based on that, from 480 to 600 °C, the occurrence of severe weight loss could be attributed to partial disintegration of the macrocyclic structure, in which low-weight atoms (such as H and a portion of N) are lost. [See: Achar, B. N., Lokesh, K. S., Fohlen, G. M., & Kumar, T. M. (2005). *Characterization of cobalt phthalocyanine sheet polymer by gas chromatography mass spectrometry on its pyrolysis products. Reactive and Functional Polymers,* 63(1), 63-69, incorporated herein by reference in its entirety.] No additional weight loss is seen in the final stage, which ranges from 600 to 900 °C, implying that the macrocycle has been destroyed, leaving only metallic copper behind. DSC showed exothermic behavior at around 380 °C is most likely due to macrocycle cleavage. The specific surface area, pore size, and volume distribution of Cu—PC were analyzed using the Brunauer-Emmett-Teller (BET) method at room temperature (22.0 °C) and nitrogen adsorption-desorption isotherms at cryogenic temperature (−196 °C or 77.35K). As illustrated in FIG. 4C, two charts display the nitrogen adsorption-desorption isotherms at 77.15 K and the pore size distribution (PSD) for Cu—PC (FIG. 4D). In these isotherms, the adsorption is denoted by black squares, and the desorption is represented by circles. According to the classification by The International Union of Pure and Applied Chemistry (IUPAC), these isotherms are categorized as type IV, indicative of microporosity with a hysteresis loop associated with capillary condensation. The initial segment of the isotherm (up to p/po 0.4) is attributed to monolayer-multilayer adsorption due to its similar path to desorption. The hysteresis loop, identified as type H3, typically suggests the presence of particle aggregates or slit-like pores in the adsorbent. By employing the BET method, the specific surface area of Cu-Pc was determined to be 412.877 $m^2/g$. This substantial surface area implies a high number of available adsorption sites, which is essential for the effective capture of oil molecules from water. The Cu-Pc, with its significant surface area, is capable of rapidly and efficiently absorbing a considerable amount of oil, thereby enhancing the separation process of oil from water. The high surface area of Cu-Pc facilitates more active sites for interaction with oil molecules, leading to a more expedient and effective oil-water separation.

TABLE 1

XRD data of copper phthalocyanine.

| Peak No. | 2θ (deg) | Sin θ | d-spacings (nm) |
|---|---|---|---|
| 1 | 17.51952 | 0.1505 | 1.886183193 |
| 2 | 22.34277 | 0.1900 | 0.511673146 |
| 3 | 23.49599 | 0.1993 | 0.5952088 |
| 4 | 24.15597 | 0.2046 | 1.037384558 |
| 5 | 27.2976 | 0.2293 | 0.168118716 |

Example 3: Ultraviolet-Visible (UV-Vis) Characterization of the Compound 4

Figure 5:
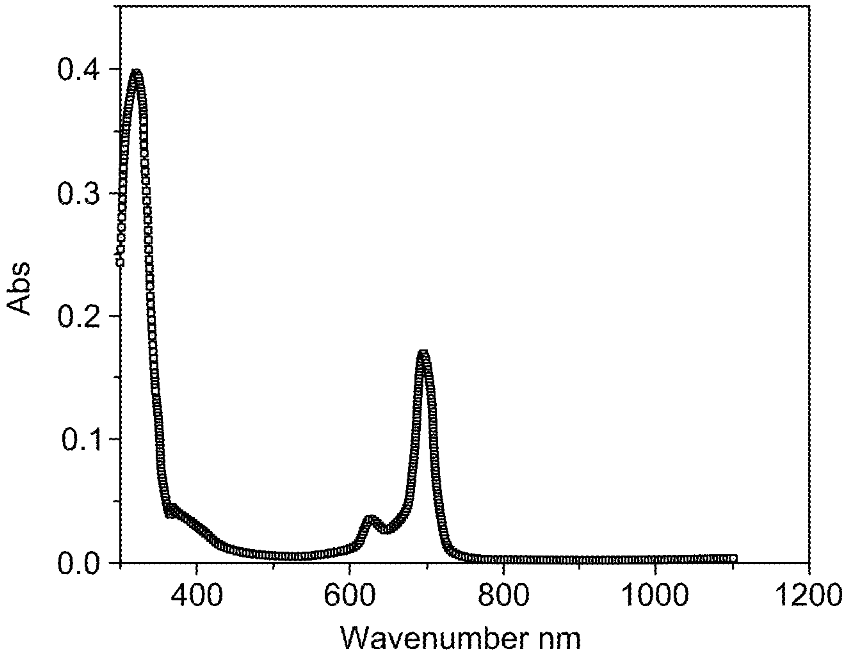
FIG. 5 shows ultraviolet-visible (UV-Vis) spectrum of compound 4, according to certain embodiments.
Figure 6A:
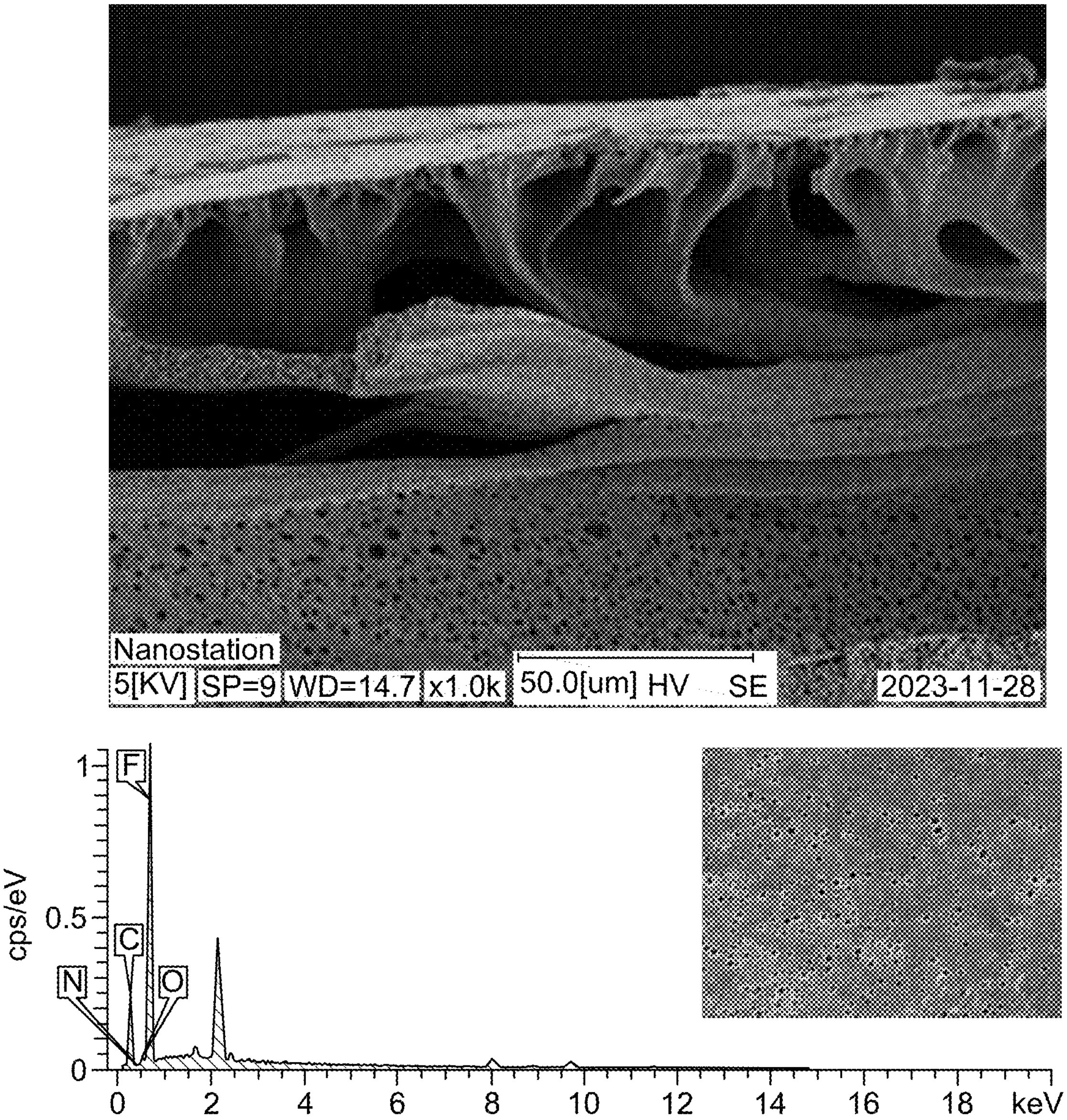
FIG. 6A shows cross-sectional scanning electron microscope (SEM) images and energy-dispersive X-ray (EDX) spectrum of pristine PVDF membrane, according to certain embodiments.
Figure 6B:
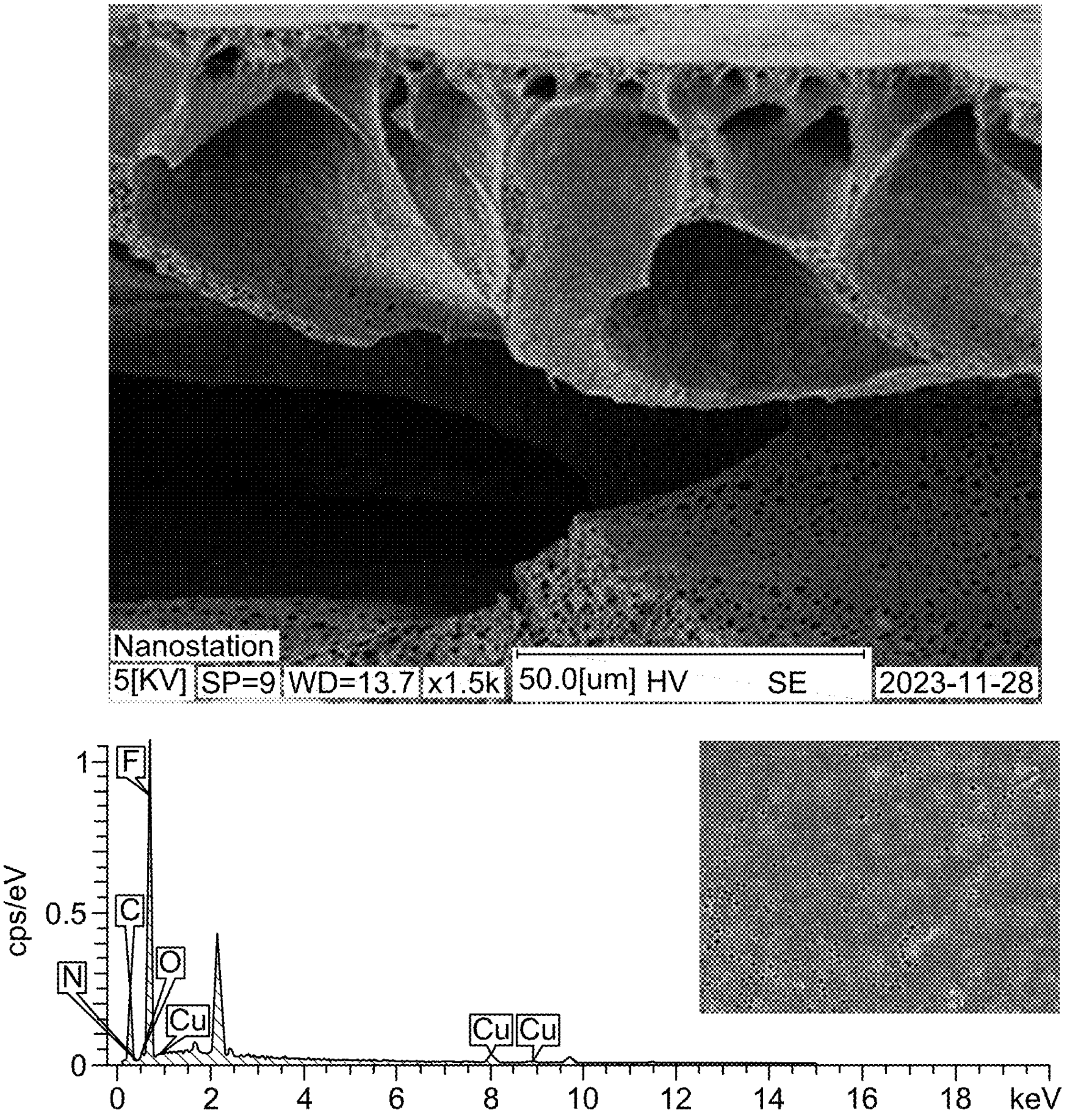
FIG. 6B shows cross-sectional SEM images and an EDX spectrum of 0.2 wt. % CuPc-incorporated PVDF membrane, according to certain embodiments.
Figure 6C:
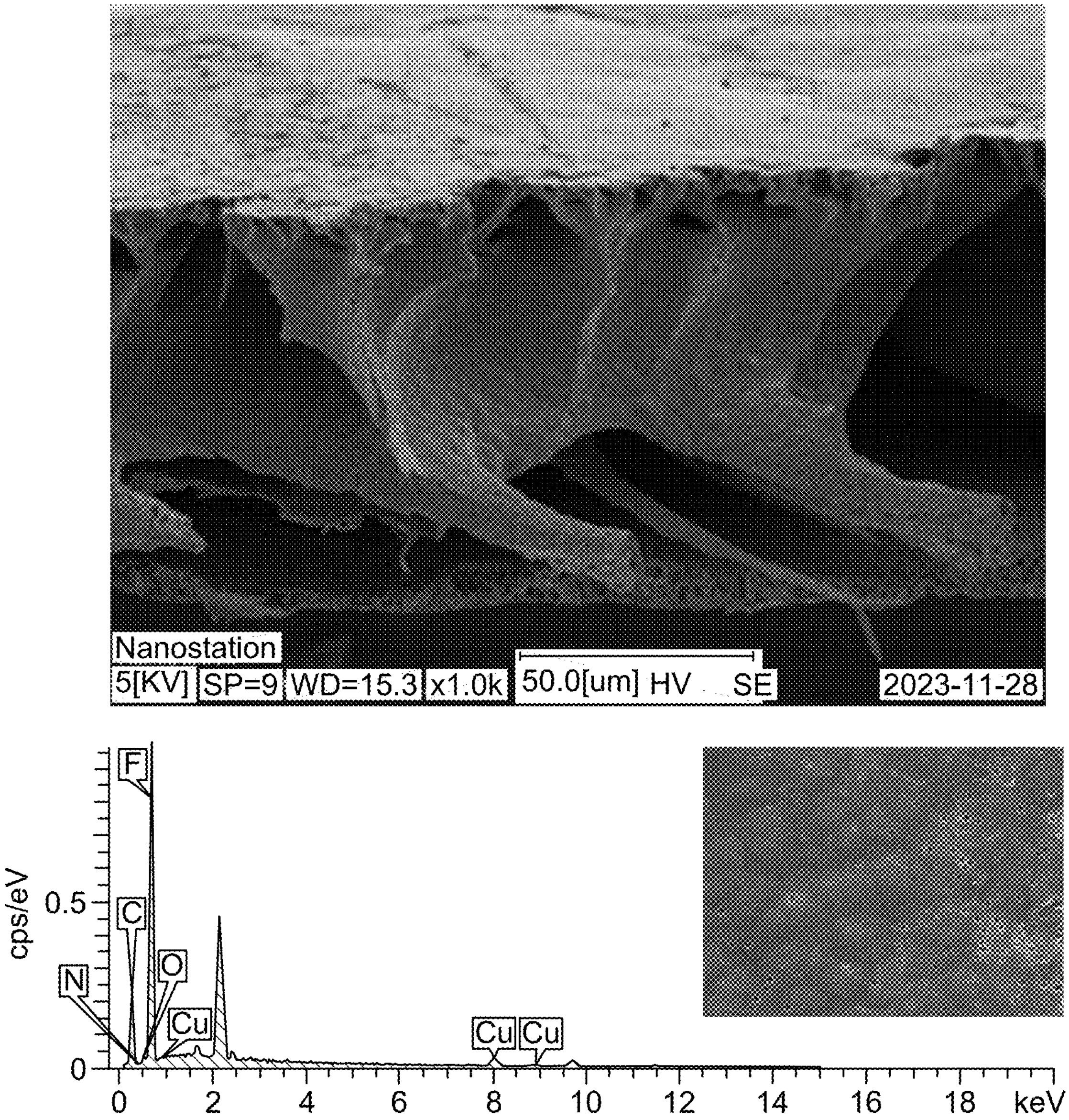
FIG. 6C shows Cross-sectional SEM images and EDX spectrum of 0.4 wt. % CuPc-incorporated PVDF membrane, according to certain embodiments.
Figure 6D:
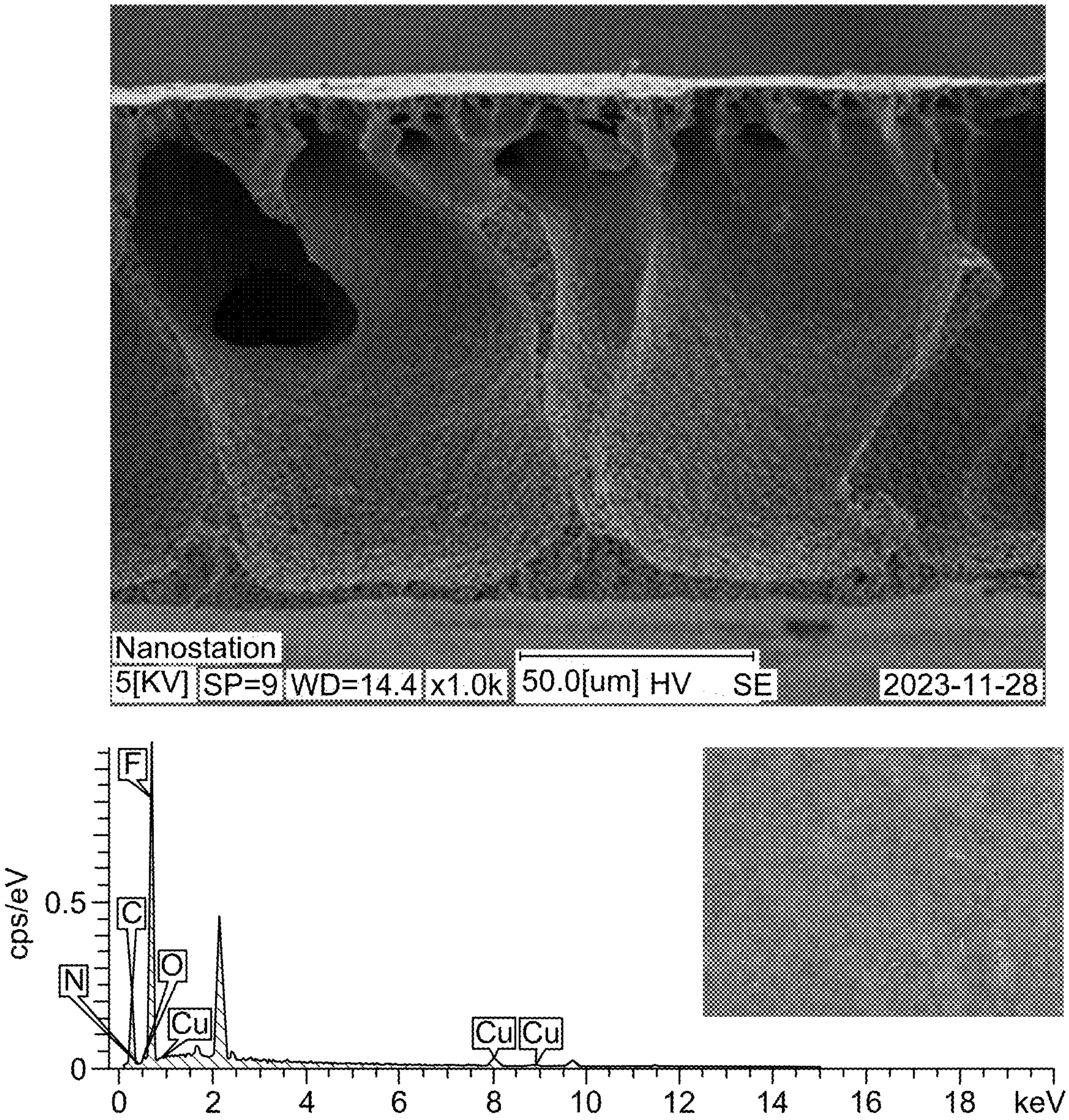
FIG. 6D shows Cross-sectional SEM images and EDX spectrum of 0.6 wt. % CuPc-incorporated PVDF membrane, according to certain embodiments.
Figure 7A:
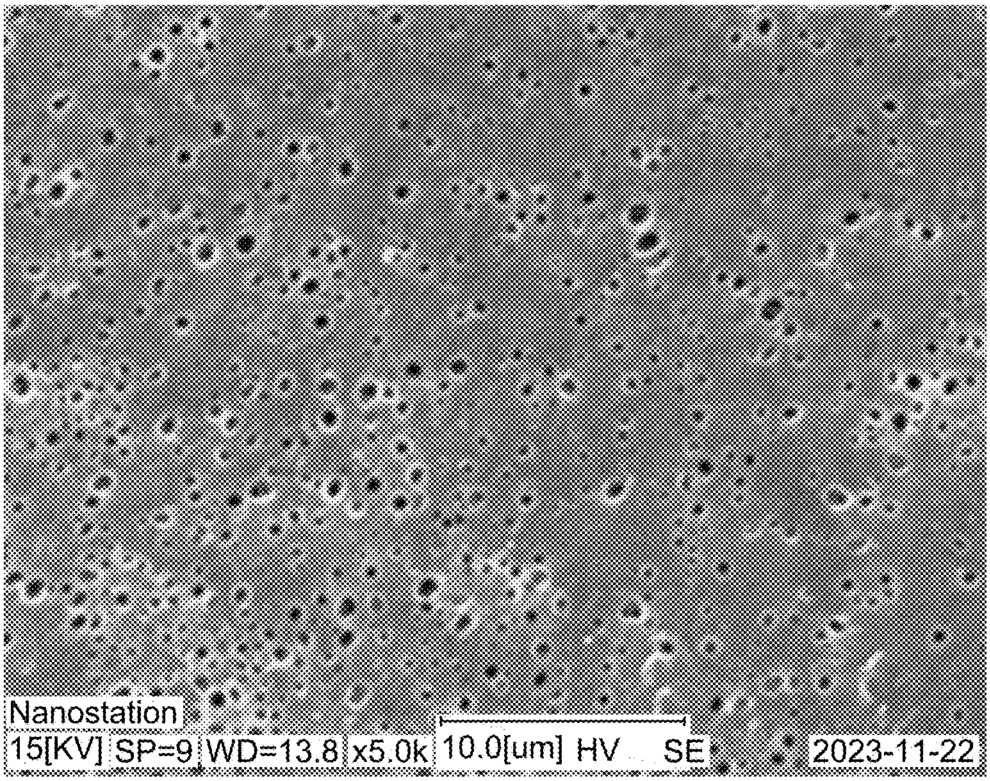
FIGS. 7A-7F show EDX elemental mapping of pristine PVDF membranes, according to certain embodiments.
Figure 7B:
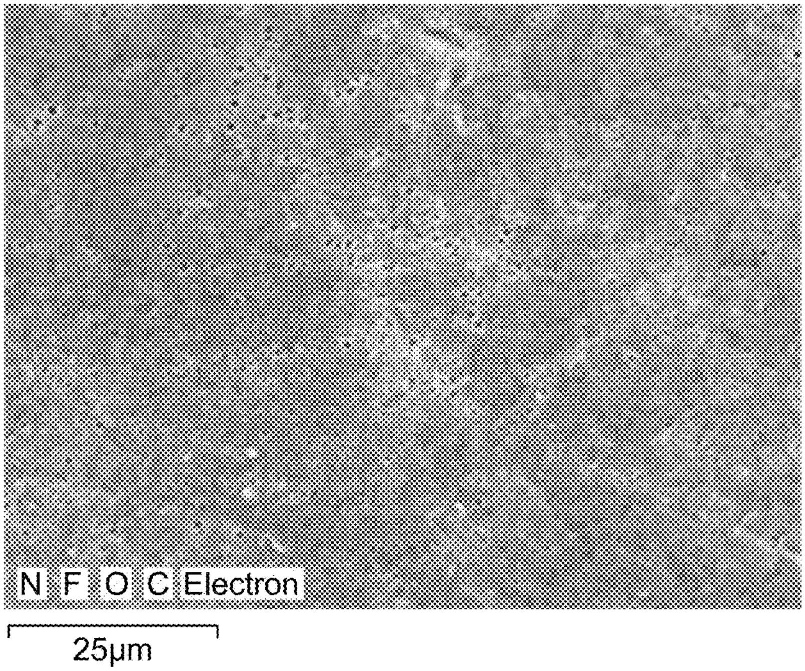
Figure 7C:
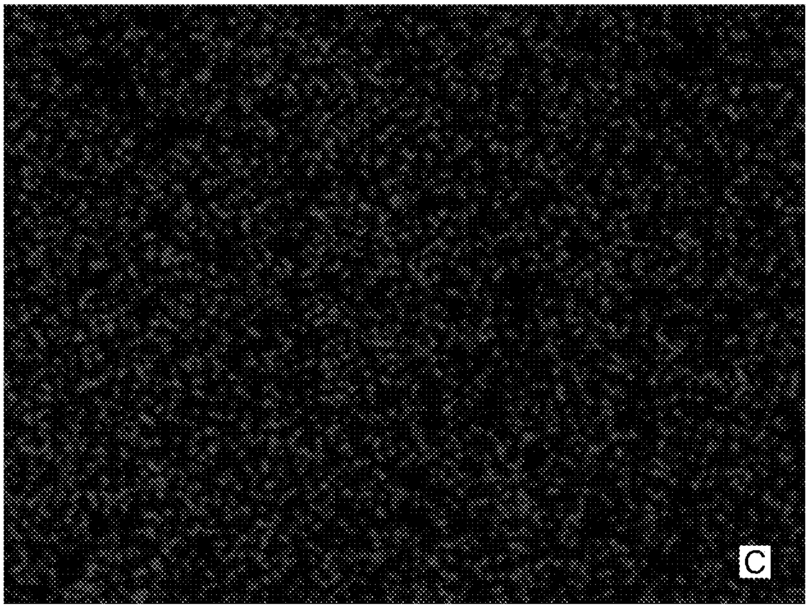
Figure 7D:
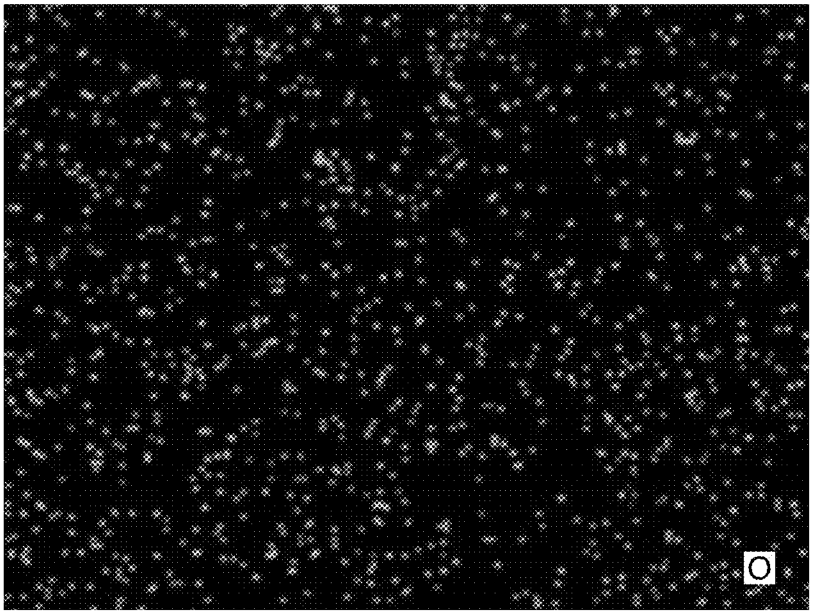
Figure 7E:
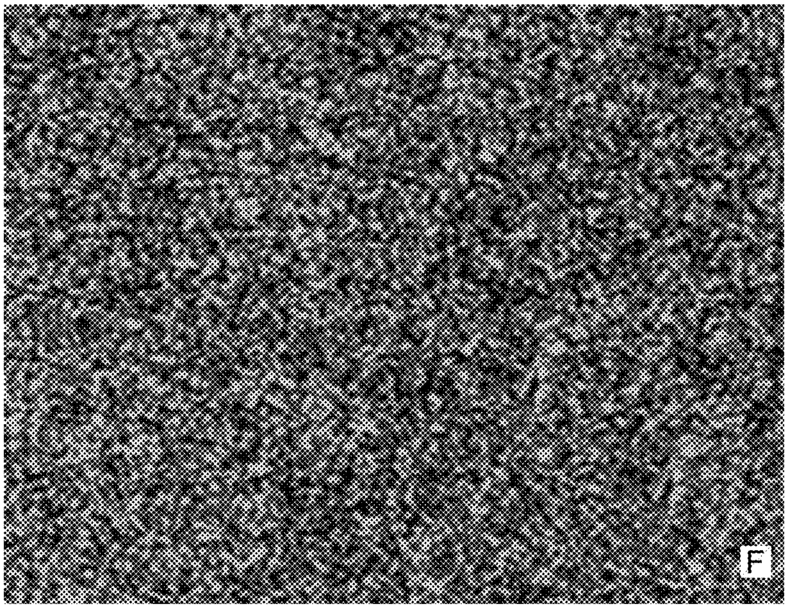
Figure 7F:
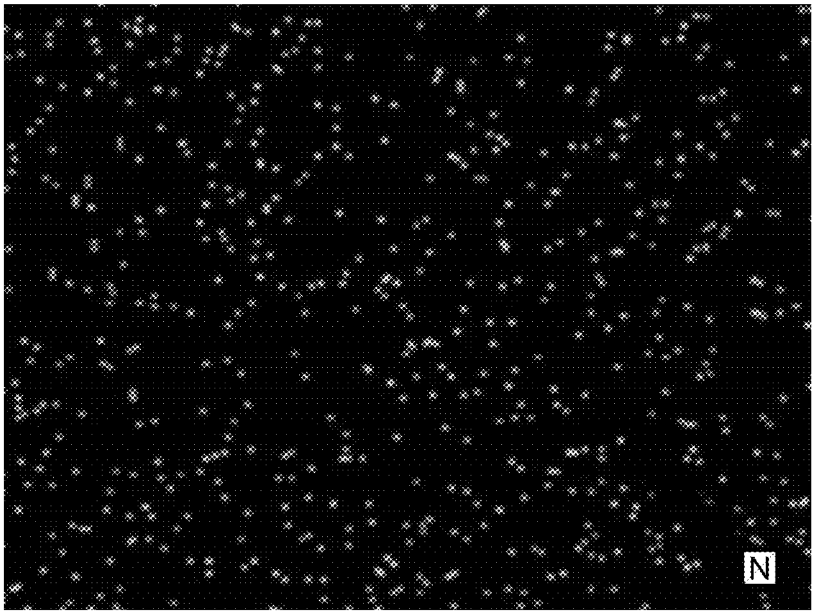
Figure 7G:
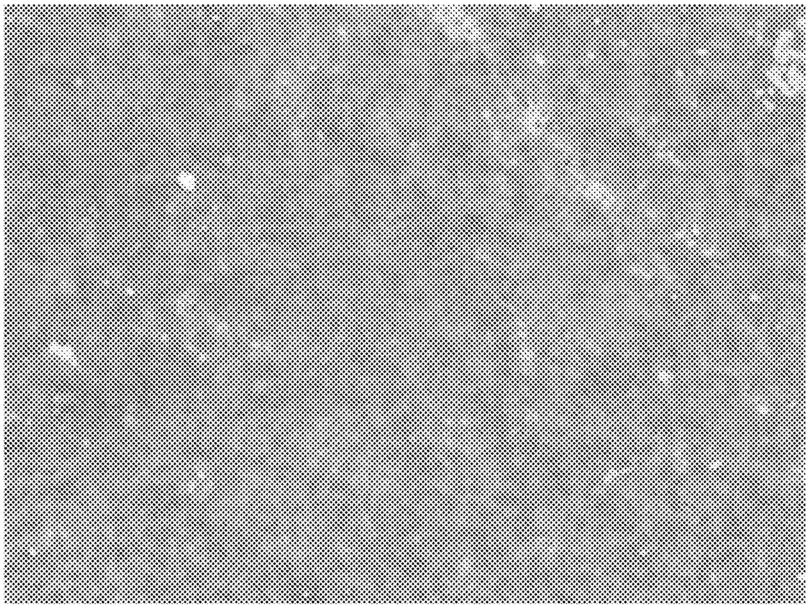
FIGS. 7G-7L show EDX elemental mapping of 0.6 wt. % CuPc-incorporated PVDF membrane, according to certain embodiments.
Figure 7H:
Figure 7I:
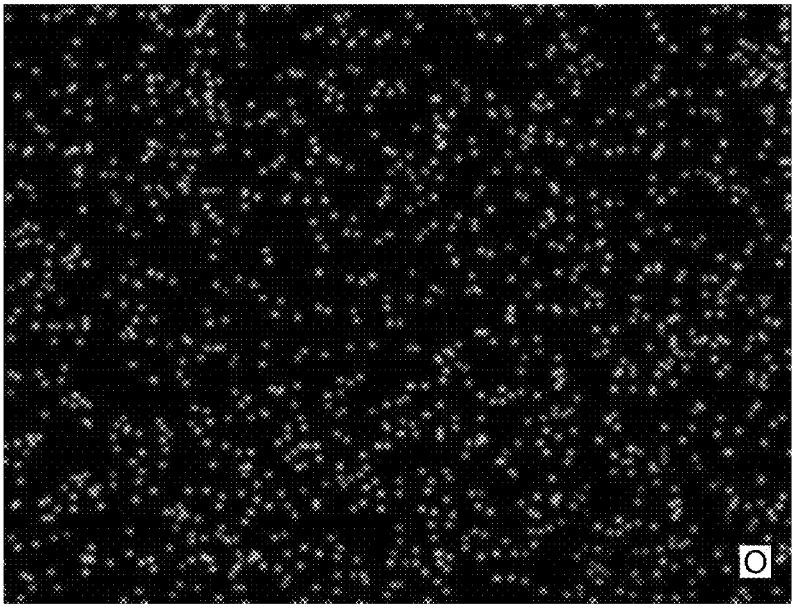
Figure 7J:
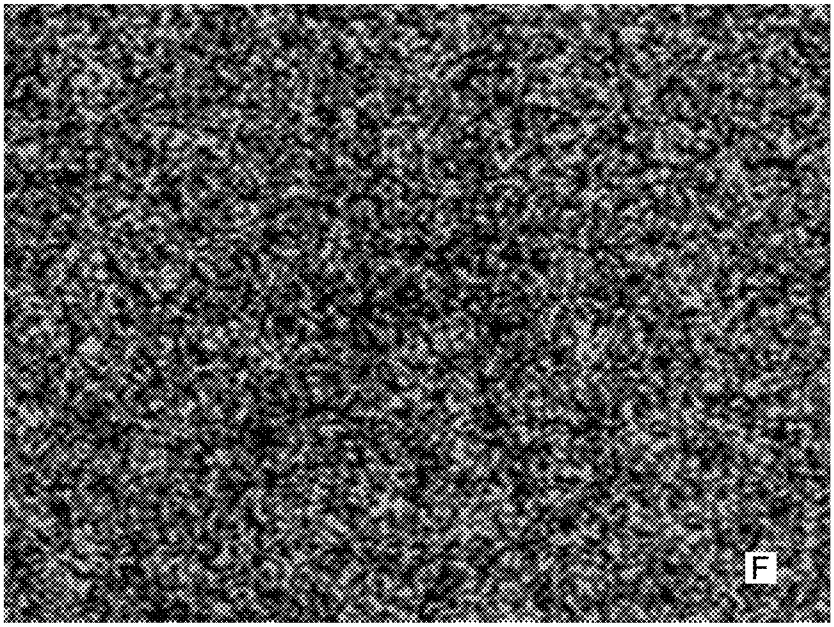
Figure 7K:
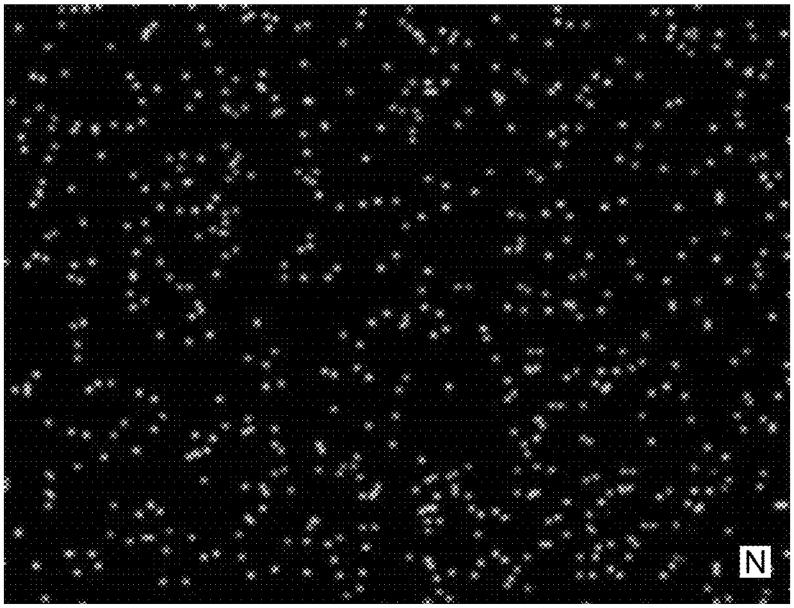
Figure 7L:
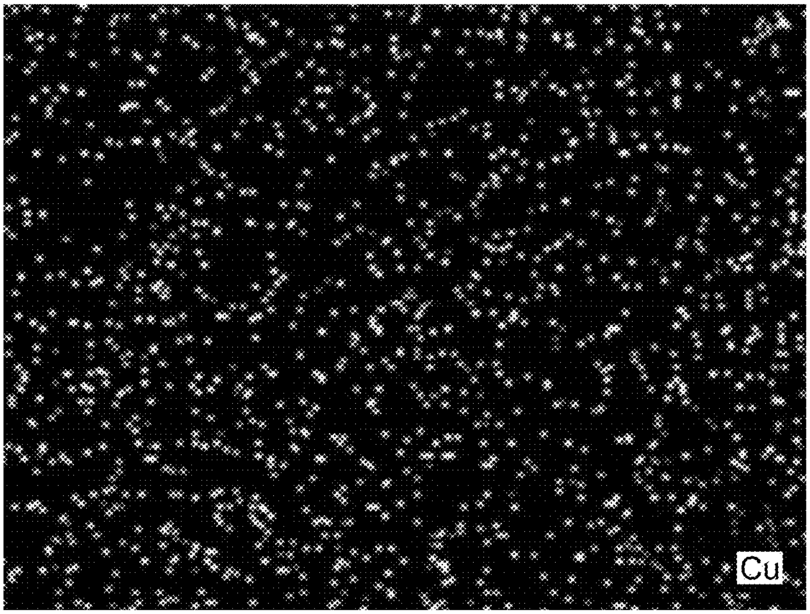

The UV-Visible spectra of CuPc (FIG. 5) displayed distinct absorption peaks in the Q-band region between 600 and 700 nm, with the Q-band peak at 695 nm linked to compound 4, attributed to the π→π*transitions from the phthalocyanine ring's highest occupied molecular orbital (HOMO) to its lowest unoccupied molecular orbital (LUMO). The B band, observed in the 280-400 nm range, resulted from transitions from deeper π levels to LUMO. Compound 4 (Cu-Pc) demonstrates H-type aggregation, evident through the broadening of Q-band absorption. This aggregation in mononuclear compound 4, likely due to the intramolecular interactions within the metal-containing phthalocyanine units, results in the broadening or splitting of the Q-band absorptions.

Example 4: Membrane Fabrication

A predetermined amount of PVDF powder, which had been pre-dried at 60 °C to eliminate moisture, along with Cu-phthalocyanine, was mixed into DMAc to form casting solutions containing 50% PVDF and varying concentrations of Cu-phthalocyanine (0.2, 0.4, and 0.6 wt. %). This mixture was further enriched by adding 2% PVP. The solution underwent sonication for 1 hour, followed by continuous stirring at 60 °C throughout the night to ensure a uniform mixture. This was then followed by a degassing process for 1 hour. The solution was left undisturbed for 24 hours to allow any remaining bubbles to escape, after which it was cast using a doctor's blade and promptly moved to a coagulation bath. The newly created membranes were soaked in deionized water overnight to complete the phase inversion process. A control membrane of pure PVDF was also produced using the identical method but without incorporating Cu-phthalocyanine.

Example 5: Characterization of the Membrane

FIG. 6 showcases the cross-sectional electron micrographs, the surface textures, and the elemental composition of the membranes. The unmodified PVDF membrane (FIG. 6A) presents two distinct structural layers: a top layer that's thin and compact, responsible for filtering and allowing substances to pass through, and a bottom layer that's porous with a finger-like structure, providing structural support.

The introduction of CuPc into the membrane (FIGS. 6B-6D) led to a slight increase in the thickness of the top active layer by a few nanometers and filled up the internal pores, thereby reducing the passage of oil droplets. Although the original PVDF membrane developed larger pores due to PVP inclusion during its creation, the surfaces and cross-sections remained intact without any fractures. The addition of CuPc primarily reduced pore formation, resulting in denser, composite polymer membranes. Additionally, the elemental distribution on the membrane surfaces is depicted in FIG. 7. FIGS. 7A-7F show EDX elemental mapping of pristine PVDF membranes, and FIGS. 7G-7L show EDX elemental mapping of 0.6 wt. % CuPc-incorporated PVDF membrane.

Example 6: Oil-Water Separation

Figure 8A:
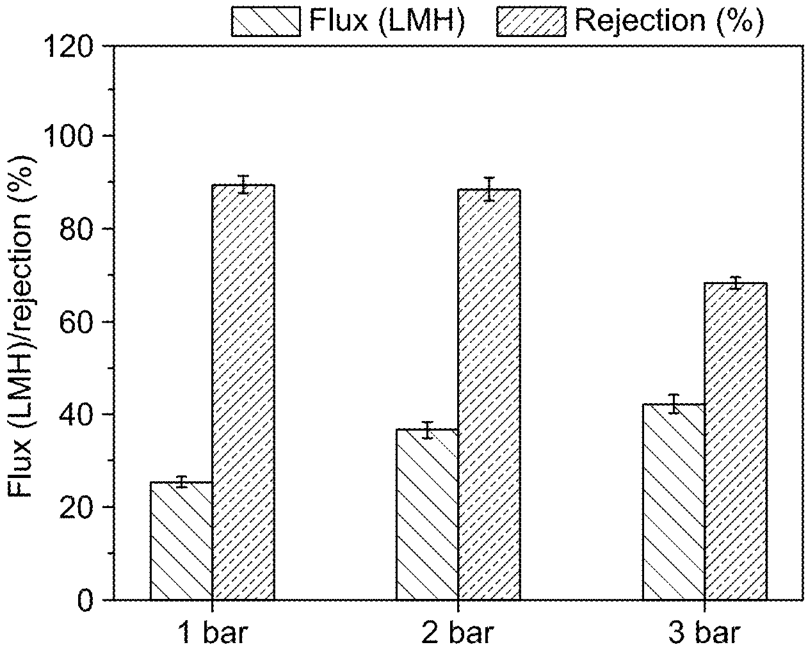
FIG. 8A shows permeate flux and oil rejection performance of the pristine PVDF membrane at 1 to 3 bar, according to certain embodiments.
Figure 8B:
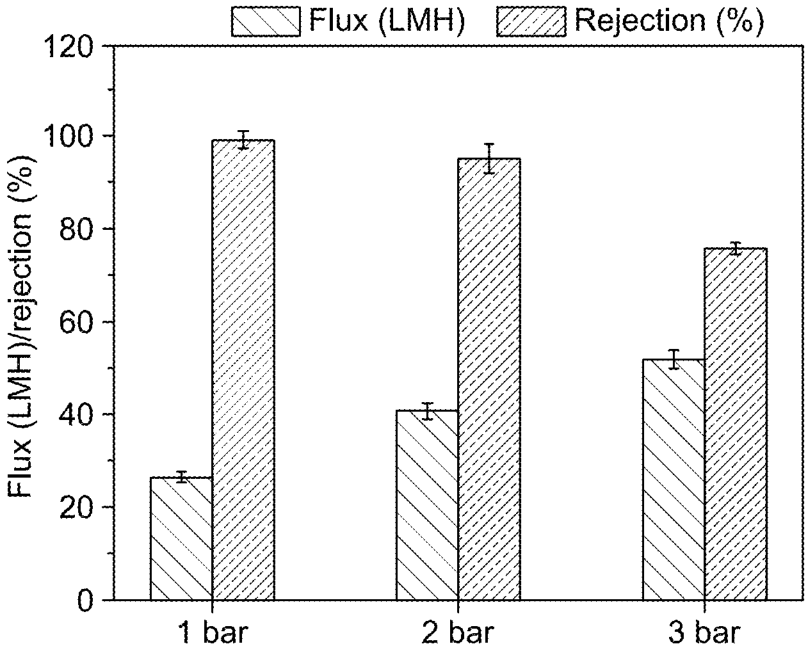
FIG. 8B shows permeate flux and oil performance of the 0.2 wt. % CuPc membrane at 1 to 3 bar, according to certain embodiments.
Figure 8C:
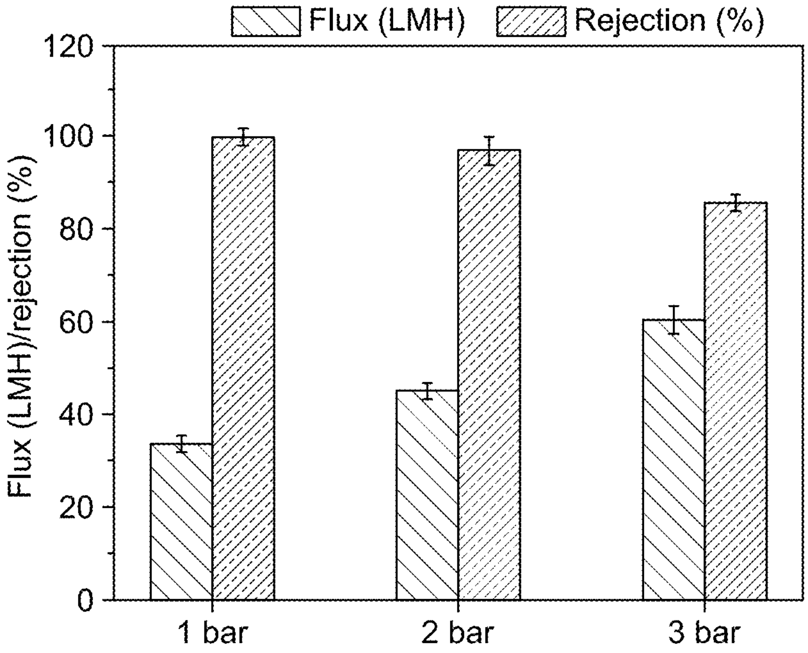
FIG. 8C shows permeate flux and oil performance of the 0.4 wt. % CuPc membrane at 1 to 3 bar, according to certain embodiments.
Figure 8D:
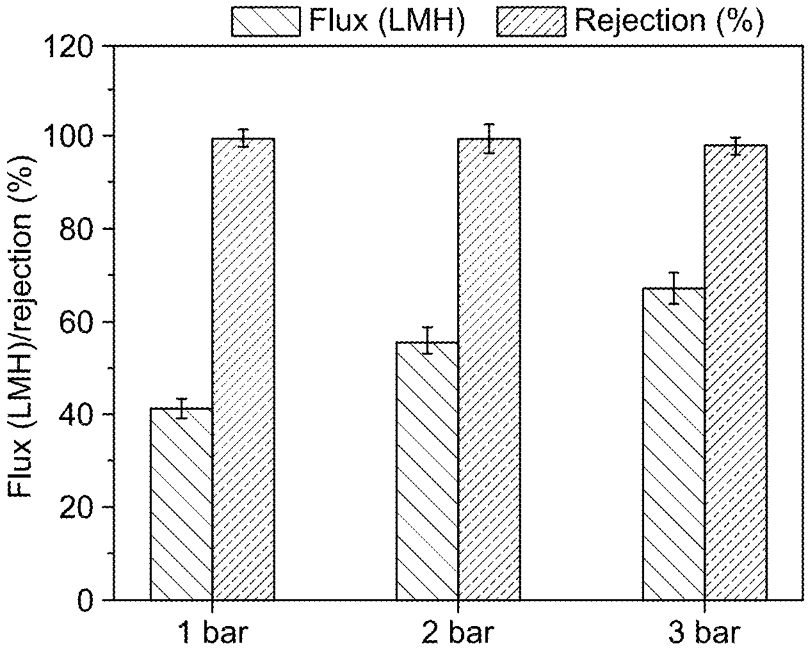
FIG. 8D shows permeate flux and oil performance of the 0.6 wt. % CuPc membrane at 1 to 3 bar, according to certain embodiments.
Figure 8E:
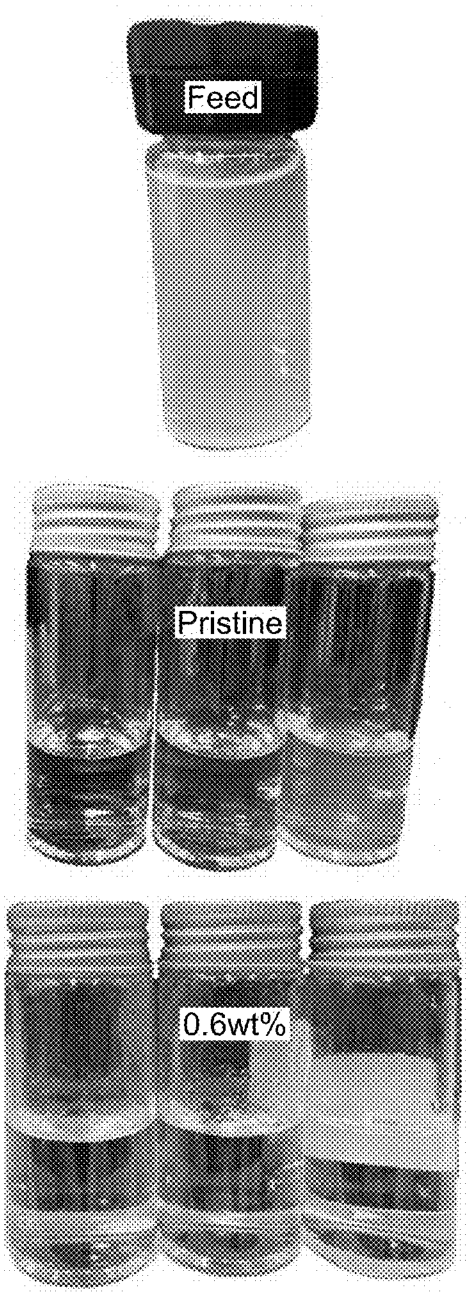
FIG. 8E shows the feed emulsion and the permeate on the pristine and the 0.6 wt. % CuPc membranes at 1 to 3 bar (from left to right), according to certain embodiments.

The membranes' efficiency in separating oil from surfactant-stabilized oil-in-water emulsions was assessed using a dead-end filtration setup, applying transmembrane pressures ranging from 1 to 3 bar. Each 50 mm diameter membrane was pre-compacted for 1 hour with deionized water, and the oil retention rates were determined using equations 1 and 2. The findings are displayed in FIGS. 8A-8D. At a pressure of 1 bar, the standard PVDF membrane showed a lower oil rejection rate of 89.8% due to its hydrophobic surface and larger pore size, which further decreased to 68.5% at 3 bar. The CuPc@PVDF membranes demonstrated exceptional rejection rates, exceeding 99% at 1 bar for all samples, though slightly decreasing to 98.2% for the membrane with 0.6 wt. % CuPc. These high-performance levels are likely due to the distinctive ball-type Pc structure within the membrane matrix, which not only increased the membrane's hydrophilicity and reduced its pore size but also significantly improved oil rejection capabilities. This is visually supported by FIG. 8E, which shows that while the filtrate from the original PVDF membrane retained the feed's milky appearance, the 0.6 wt. % CuPc@PVDF membrane produced remarkably clear permeates. This indicates the superior potential of the CuPc@PVDF membrane in efficiently demulsifying oily wastewater.

$$J_w = \frac{V}{A \times \Delta t} \quad (1)$$

$$R\ \% = \left(\frac{C_f - C_p}{C_f}\right) \times 100 \quad (2)$$

Example 7: Fouling Analysis

Figure 9A:
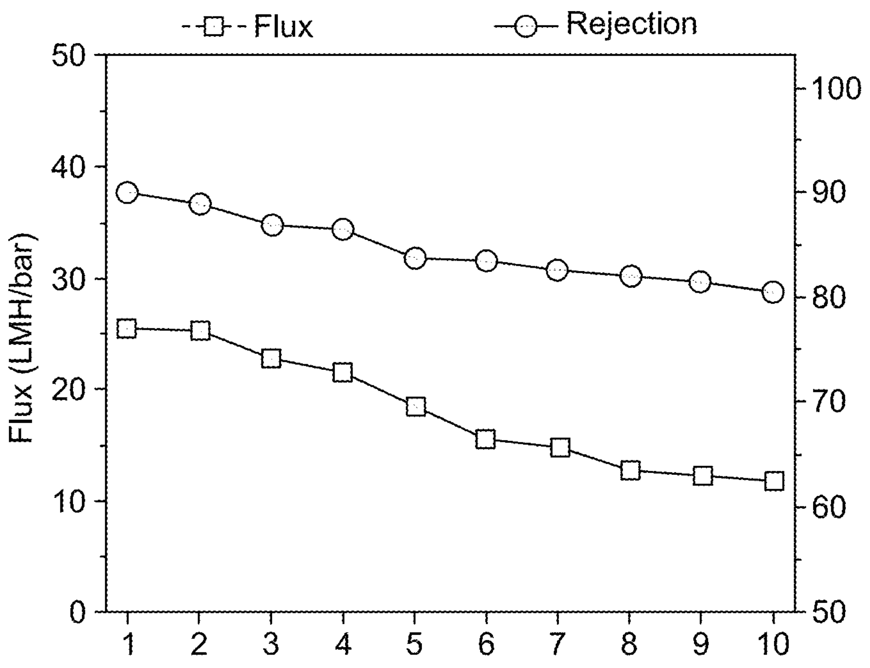
FIG. 9A shows permeate flux and oil rejection stability test at 1 bar on the pristine PVDF, according to certain embodiments.
Figure 9B:
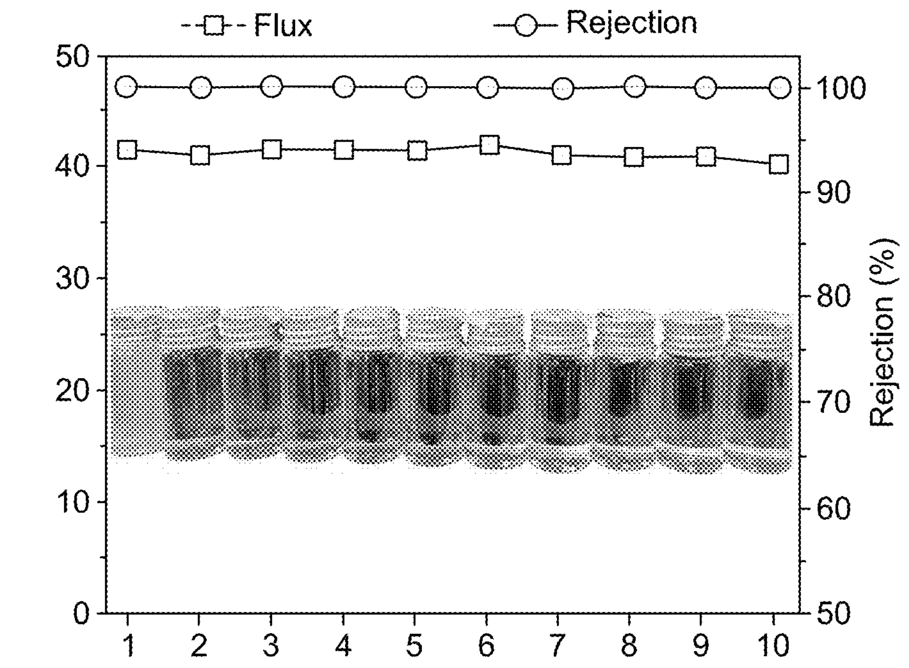
FIG. 9B shows permeate flux and oil rejection stability test at 1 bar on the 0.6 wt. % CuPc membranes, according to certain embodiments.
Figure 9C:
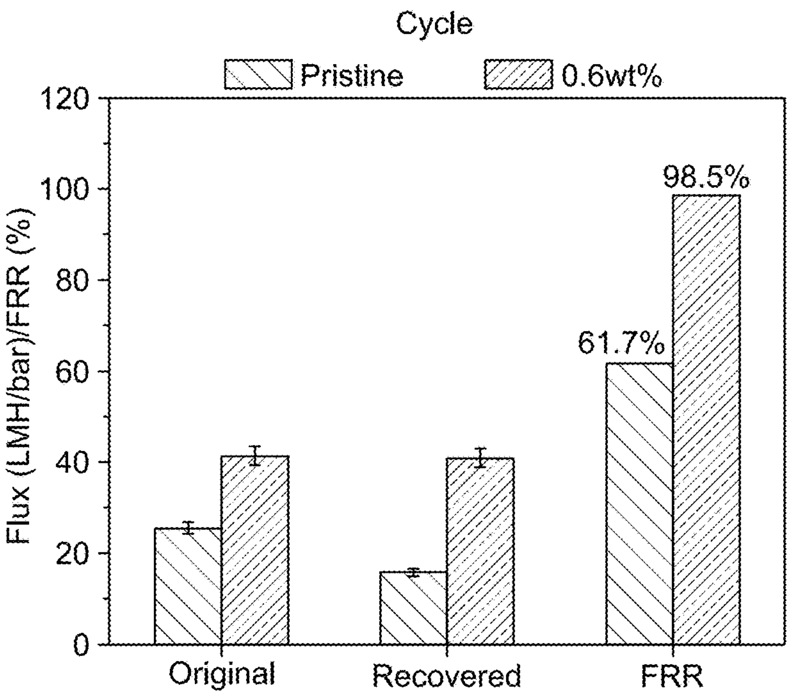
FIG. 9C shows a flux recovery ratio on pristine PVDF and 0.6 wt. % CuPc membranes after 10 cycles of demulsification, according to certain embodiments.
Figure 9D:
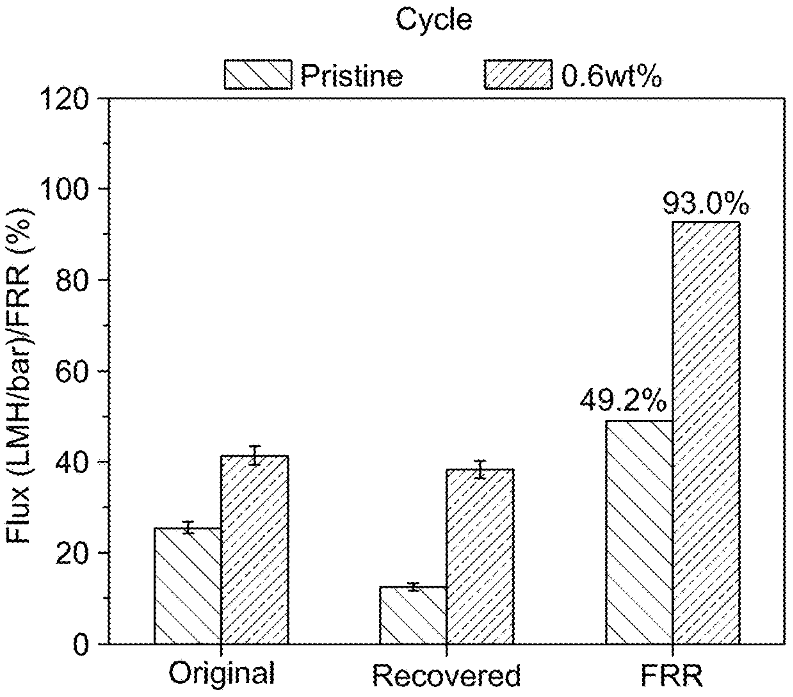
FIG. 9D shows flux recovery ratio after 1 hour of continuous demulsification in the presence of 10 mg/L alginate and 10 mg/L $Ca^{2+}$ on pristine PVDF and 0.6 wt. % CuPc membranes, according to certain embodiments.

The decline in flux due to reversible (rr) and irreversible (rir) fouling of the pristine PVDF and the 0.6 wt. % CuPc@PVDF membranes were further evaluated by conducting 10 cycles of demulsification at 1 bar, and the results are presented in FIGS. 9A-9B. Fouling is a common phenomenon during the separation of oil-in-water emulsions and occasionally results in severe consequences such as blocking of the membrane pores, and the decline in oil rejection and permeate flux [See: N. Baig, A. M. Alowaid, L Abdulazeez, B. Salhi, M. Sajid, L Kammakakam, *Designing of nanotextured inorganic-organic hybrid PVDF membrane for efficient separation of the oil-in-water emulsions, Chemosphere,* 308 (2022) 136531, incorporated herein by reference in its entirety]. During the oil-in-water demulsification, the membrane interface is often overwhelmed by the accumulation of large oil droplets resulting in the formation of cake layers, whereas the tiny oil droplets are transported through the membrane channels. These processes both result in the fouling of the membrane with severe consequences such as loss in flux and a decline in oil rejection rate. Loss of flux due to fouling is of two types: reversible (rr) and irreversible (rir) fouling. Reversible fouling is caused by gel formation on the membrane surface and is easily removed through flushing or backwashing, while irreversible fouling is due to pore-clogging by the foulants and often requires chemical cleaning. The resistance to fouling by a membrane is thus measured by analyzing its tendency to resist the cake formation and is expressed in terms of the flux recovery ratio (FRR) after exposure to the emulsion in various cycles. The PVDF membrane experienced severe fouling during 10 cycles of demulsification with more than a 50% decline in flux (FIG. 9A). Similarly, the oil rejection dropped drastically and steadily, implying the continuous accumulation and growth of cake layers on the membrane's active layer. On the 0.6 wt. % CuPc@PVDF membrane, however (FIG. 9B), steady flux and oil rejection were maintained, implying the membrane's fouling resistance. These results demonstrate the oil-repelling properties of the CuPc@PVDF membrane due to the incorporation of copper-containing phthalocyanine. Moreover, the coordination within the macrocyclic cavity prevents the leaching of the copper ions, maintaining the flux and rejection for several cycles. Consequently, an FRR of 98.5% was achieved on the CuPc@PVDF membrane, with an extremely low irreversible flux of 1.5% (FIG. 9C). The pristine PVDF recorded an FRR of 61.7%, implying it high tendency to fouling. Furthermore, the fouling resistance of the membranes in the presence of organic foulant (sodium alginate) and Ca2+ ions was investigated by passing the feed emulsion containing the foulants through the membranes for 1 hour at a transmembrane pressure of 1 bar. At the end of the demulsification, the membranes were removed and washed thoroughly, and the loss in flux was estimated, as presented in FIG. 9D. Organic fouling accounts for a large portion of complete membrane fouling, as well as this procedure is exacerbated due to the production of thick fouling layers on the membrane surface in the accessibility of Ca2+ ions. The tendency of alginate molecules to create a spatially dispersed cross-linked network of Ca2+ known as the "egg box" was attributed to the drop in permeate flux on the pristine PVDF membrane. The added Ca2+ ions fit in the cavities between two 21 helical chains of alginate molecules due to strong van der Waals attraction and hydrogen bonds, followed by dimer aggregation by weak electrostatic forces [See: Braccini, L, & Perez, S. (2001). *Molecular basis of Ca2+-induced gelation in alginates and pectins: the egg-box model revisited. Biomacromolecules,* 2(4), 1089-1096; Rees, D. A. (1982). *Polysaccharide conformation in solutions and gels recent results on pectins. Carbohydrate Polymers,* 2(4), 254-263, incorporated herein by reference in its entirety.], accelerating the adhesion of the foulants to the membrane surface. Interestingly, the 0.6 wt % CuPc@PVDF maintained excellent anti-fouling properties with an estimated FRR of 93% and irreversible flux of 7%. The PVDF membrane, on the other hand, was severely fouled with over 50% loss in flux in 1 hour.

TABLE 2

Pure water flux of the pristine PVDF, 0.2 wt. %, 0.4 wt. % and 0.6 wt. % CuPc@PVDF membranes

| Pressure | Water flux (L/m$^2$h) | | | |
|---|---|---|---|---|
| (bar) | Pristine | 0.2 wt. % | 0.4 wt. % | 0.6 wt. % |
| 1 | 151.5 | 109.3 | 110.3 | 105.3 |
| 2 | 376.0 | 347.0 | 320.3 | 272.6 |
| 3 | 809.0 | 768.0 | 671.2 | 433.6 |

Numerous modifications and variations of the present disclosure are possible in light of the above teachings. It is therefore to be understood that within the scope of the appended claims, the invention may be practiced otherwise than as specifically described herein.

The invention claimed is:

1. A composite membrane for oil/water separation, comprising:

a fluoropolymer;

a stabilizer; and a copper phthalocyanine (Cu-Pc) compound having a Formula (I);

Formula [I]

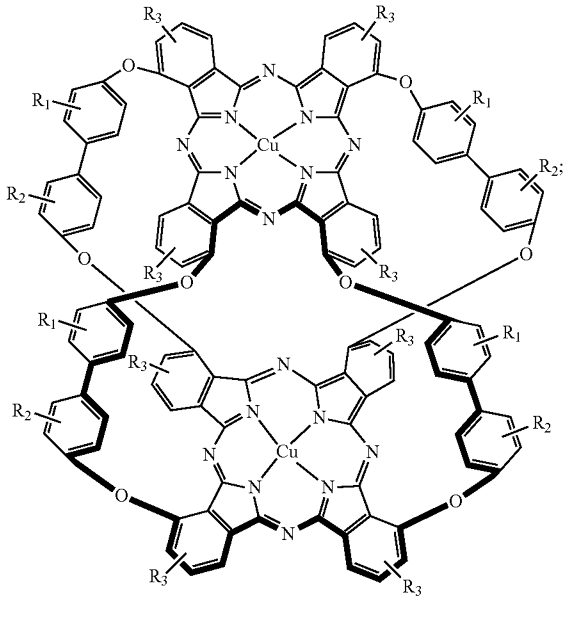

wherein $R_1$, $R_2$, and $R_3$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

2. The composite membrane of claim 1, wherein the fluoropolymer is selected from the group consisting of poly(vinylidene fluoride), copolymer of vinylidene fluoride and hexafluoropropylene, copolymer of tetrafluoroethylene and vinylidene fluoride, terpolymer of tetrafluoroethylene, vinylidene fluoride and hexafluoropropylene, and combinations thereof.

3. The composite membrane of claim 1, wherein the fluoropolymer is poly(vinylidene fluoride) (PVDF).

4. The composite membrane of claim 1, wherein the stabilizer is polyvinylpyrrolidone (PVP).

5. The composite membrane of claim 1, wherein the Cu-Pc compound has a Formula (II)

Formula [II]

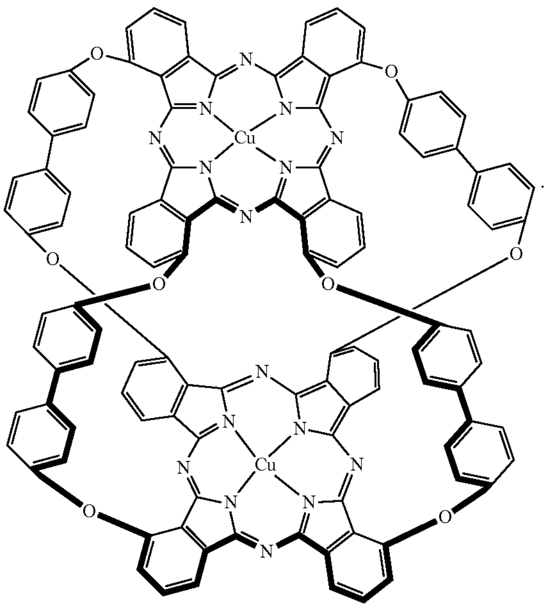

6. The composite membrane of claim 1, comprising:

89 to 99 wt. % of the fluoropolymer;

1 to 8 wt. % of the stabilizer; and 0.01 to 3 wt. % of the Cu-Pc compound, each wt. % based on a total weight of the composite membrane.

7. The composite membrane of claim 6, wherein the fluoropolymer is PVDF, and the stabilizer is PVP, and wherein the composite membrane comprises:

93 to 98 wt. % of PVDF;

3 to 5 wt. % of PVP; and 0.4 to 1.2 wt. % of the Cu-Pc compound, each wt. % based on the total weight of the composite membrane.

8. The composite membrane of claim 1, wherein the composite membrane has a layered structure comprising a surface layer and a bottom layer.

9. The composite membrane of claim 8, wherein the surface layer is in the form of a porous sheet having an average thickness of 50 to 800 nanometers (nm).

10. The composite membrane of claim 8, wherein the bottom layer is in the form of a finger-like porous structure layer having an average thickness of 30 to 100 micrometers (μm).

11. The composite membrane of claim 1, wherein the Cu-Pc compound is present in an amount of about 0.2 to 1.2 wt. % based on a total weight of the composite membrane, and wherein the composite membrane has a water flux of from 100 to 115 liters per square meter per hour (L/m$^2$ h) under a pressure of about 1 bar.

12. The composite membrane of claim 1, wherein the Cu-Pc compound is present in an amount of about 0.2 to 1.2 wt. % based on a total weight of the composite membrane, and wherein the composite membrane has a water flux of from 260 to 360 $L/m^2$ h under a pressure of about 2 bar.

13. The composite membrane of claim 1, wherein the Cu-Pc compound is present in an amount of about 0.2 to 1.2 wt. % based on a total weight of the composite membrane, and wherein the composite membrane has a water flux of from 420 to 780 $L/m^2$ h under a pressure of about 3 bar.

14. A method for oil/water separation, comprising:

passing a fluid mixture comprising oil and water through the composite membrane of claim 1 to form an oil layer on a surface of the composite membrane, and a residue stream.

15. The method of claim 14, wherein the passing is performed under a pressure of from 1 to 3 bar.

16. The method of claim 14, wherein the oil comprises at least one water-insoluble hydrocarbon containing 5 to 22 carbon atoms.

17. The method of claim 14, wherein the residue stream is substantially free of oil.

18. The method of claim 14, having an oil rejection rate of at least 98% based on an amount of oil present in the fluid mixture under a pressure of 1 to 3 bar.

19. The method of claim 14, further comprising preparing the Cu-Pc compound by:

mixing and heating a nitrophthalonitrile of Formula (III), a biphenol of Formula (IV) and DMSO in the presence of a base to form a precursor; and heating the precursor and copper (II) acetate to form a mixture, and washing;

wherein Formula (III) is

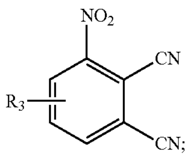

wherein Formula (IV) is

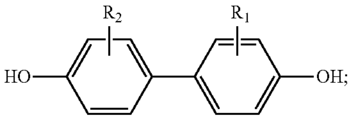

and wherein $R_1$, $R_2$, and $R_3$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group.

20. The method of claim 19, wherein the nitrophthalonitrile is 3-nitrophthalonitrile, and the biphenol is 4,4'-dihydroxybiphenyl.

* * * * *